US012452989B2

(12) United States Patent
Martin

(10) Patent No.: US 12,452,989 B2
(45) Date of Patent: Oct. 21, 2025

(54) PULSED PLASMA THRUSTERS WITH CONDUCTIVE LIQUID SACRIFICIAL ELECTRODE(S)

(71) Applicant: Government of the United States, as represented by the Secretary of the Air Force, Wright-Patterson AFB, OH (US)

(72) Inventor: Robert S. Martin, Delafield, WI (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/460,773

(22) Filed: Sep. 5, 2023

(65) Prior Publication Data

US 2025/0081321 A1 Mar. 6, 2025

(51) Int. Cl.
*H05H 1/48* (2006.01)
*B64G 1/40* (2006.01)

(52) U.S. Cl.
CPC ............... *H05H 1/48* (2013.01); *B64G 1/413* (2023.08)

(58) Field of Classification Search
CPC ...... F03H 1/0012; F03H 1/0087; B64G 1/405
See application file for complete search history.

(56) References Cited

U.S. PATENT DOCUMENTS 3,350,884 A * 11/1967 Colombani ............... F02K 5/00 219/121.36
5,924,278 A 7/1999 Burton et al.
6,216,445 B1 4/2001 Byers et al.
6,818,853 B1 11/2004 Schein et al.
7,302,792 B2 12/2007 Land, III et al.
10,107,271 B2 10/2018 Keider et al.
10,570,892 B2 2/2020 Woodruff et al.
11,242,844 B2 2/2022 Woodruff et al.
(Continued)

OTHER PUBLICATIONS

Antipov, et al., "Investigation of the Initial Stage of the Discharge in Ablative Pulsed Plasma Thrusters", Journal of Surface investigation: X-ray, Synchroton and neutron Techniques, Feb. 17, 2018, vol. 12, No. 5, pp. 1037-1040.
(Continued)

*Primary Examiner* — David P. Olynick
(74) *Attorney, Agent, or Firm* — AFMCLO/JAZ; Richard M. Mescher

(57) ABSTRACT

A conductive liquid-fed pulsed plasma thruster includes a first electrode having a conductive solid portion and a conductive liquid portion, a second electrode separated from the first electrode to define an ignition space therebetween, at least one electric insulator separating the first and second electrodes, and a conductive-liquid passage extending within the conductive solid portion through which the conductive liquid portion flows from an inlet to an outlet located at the ignition space. The first and second electrodes are configured so that a drop of the conductive liquid portion forms and grows at the outlet when the conductive liquid portion flows through the conductive liquid passage until the drop of the conductive liquid causes an arc discharge between the drop and the second electrode that ignites the drop to produce a plasma cloud that generates thrust when exhausted.

18 Claims, 15 Drawing Sheets

(56) References Cited

U.S. PATENT DOCUMENTS

| | | | |
|---|---|---|---|
| 11,542,042 | B2 | 1/2023 | Daniels et al. |
| 11,554,883 | B2 | 1/2023 | Sashurin et al. |
| 2022/0106944 | A1 | 4/2022 | Woodruff et al. |

OTHER PUBLICATIONS

Bogatyi et al., "Mechanisms for the Formation of Parasitic Propellant Consumption in an Ablative Pulsed Plasma Thruster", Cosmic Research, Apr. 25, 2019, vol. 57, No. 5, pp. 310-316.
busek.com/technologies_ppt.htm, "Pulsed Plasma Thrusters", Nov. 24, 2020 (print date).
www.nasa.gov/specials/appollo50th/index.html, "Green propellant Infusion Mission (GPIM) Overview", Nov. 24, 2020 (print date).
Keider, "Micro-Cathode Arc Thrusters for CubeSat Propulsion", 2018 Interplanetary CubeSat Workshop, The George Washington University.
Krishman et al., "Metal Plasma Thruster for Small Satellites", Jul. 2020, Journal of Propulsion and Power, vol. 36, No. 4, Jul.-Aug. 2020.
La Pointe et al., "High Power Electromagnetic Thrusters for Spacecraft Propulsion", Feb. 16, 2021, Proceedings of IMECE2002. Asme International Mechanical Engineering Congress & Exposition, Nov. 17-22, 2002, New Orleans, LA.
Li et al., "Design and demonstration of micro-scale vacuum cathode arc thruster with inductive energy storage circuit", Acta Astronautica, 172, Jul. 2020, pp. 33-46.
Markusic, Liquid-Metal-Fed Pulsed Electromagnetic Thrusters for In-Space Propulsion, Jan. 1, 2004, JANNAF Propulsion Meeting, Las Vegas Nevada.
Pancotti, "A study of ignition effects on thruster performance of a multi-electrode capillary discharge using visible emission spectroscopy diagnostics", Dec. 2009, A Dissertation Presented to the Faculty of the Graduate School University of Southern California.
Polzin et al., "Inductive Pulsed Plasma Thruster Development Testing at NASA-MSFC", Jul. 9, 2013, AIAA/ASME/SAE/ASEE Joint Propulsion Conference, Jul. 15-17, 2013, San Jose, California.

* cited by examiner

PULSED PLASMA THRUSTERS WITH CONDUCTIVE LIQUID SACRIFICIAL ELECTRODE(S)

RIGHTS OF THE GOVERNMENT

The invention described herein may be manufactured and used by or for the Government of the United States for all governmental purposes without the payment of any royalty.

FIELD OF THE INVENTION

The present invention relates generally to spacecraft propulsion systems and, more particularly, to spacecraft pulsed plasma thruster systems.

BACKGROUND OF THE INVENTION

A spacecraft is a machine or vehicle that is designed to operate in space. Such spacecraft include, but are not limited to, rockets, space shuttles, satellites, and space stations. Spacecraft are used for a variety of purposes, including communications, navigation, scientific research and discovery, meteorology, and the like. Spacecraft propulsion is any method used to accelerate a spacecraft. In-space propulsion exclusively deals with propulsion systems used in space which is a near vacuum environment. Space is a near vacuum environment, which presents difficulties in operating, maintaining, and fueling spacecraft. These difficulties are magnified by the large distances involved and the consequential costs and timings to perform those operations.

Spacecraft propulsion systems are typically divided into four basic groups: (1) chemical propulsion, (2) electric propulsion, (3) advanced propulsion, and (4) supporting technologies; based on the physics of the propulsion system and how it derives thrust.

Chemical propulsion obtains energy needed to generate thrust by chemical reactions that create a hot gas that is expanded to produce thrust. Many different propellant combinations have been used to obtain these chemical reactions, including, for example but not limited to, hydrazine, liquid oxygen, liquid hydrogen, nitrous oxide, and hydrogen peroxide. Non-toxic "green" alternatives are now being developed to replace hydrazine. ASCENT propellant (formerly known as AF-M315E) is an example of one such green propellant. Initially developed to provide a safer handling environment than hydrazine, ASCENT offers higher overall performance than a hydrazine equivalent by creating more heat during ignition.

Electric propulsion is commonly used for station keeping of communications satellites and for prime propulsion on some scientific space missions because of their high specific impulse. Rather than relying on high temperature and fluid dynamics to accelerate the reaction mass to high speeds, there are a variety of methods that use electrostatic or electromagnetic forces to accelerate the reaction mass directly, where the reaction mass is usually a stream of ions. Electromagnetic propulsion systems include, but are not limited to: (1) ion thrustors which first accelerate and later neutralize the ion beam with an electron stream emitted from a cathode; (2) electrothermal thrusters which use electromagnetic fields to generate a plasma to increase the heat of a propellant and is then converted into kinetic energy by a nozzle; and (3) electromagnetic thrusters which accelerate ions by either Lorentz Force or electromagnetic fields. Electromagnetic thrusters include but are not limited to: (1) plasma propulsion engines which generate thrust from a quasi-neutral plasma; (2) magnetoplasmadynamic thrusters (MPDT) which use the Lorentz force to generate thrust; (3) electrodeless plasma thrusters uses ponderomotive forces to accelerate a plasma; (4) pulsed inductive thruster (PIT) which uses perpendicular electric and magnetic fields to accelerate a propellant with no electrode; (5) pulsed plasma thruster (PPT) which passes an arc through fuel to create a plasma which completes a circuit between two charged plates and is accelerated out an exhaust to create thrust; and (6) vacuum arc thrusters (VAT) which use a vacuum arc discharge, across an insulator, between two electrodes to produce thrust.

The rapid development small spacecraft including, but not limited to, micro and nano-satellite technology, has sparked interest in robust, low power, and high specific impulse propulsion systems. PPTs have been extensively investigated and employed to fill such needs. PPTs accelerate plasma propellant through the Lorentz-force-preferably with a minimum of thermal and electromagnetic loss. In lieu of an applied external magnetic field, an induced component resulting from current traversal through the electrodes and plasma supplies the B-field required for acceleration. High discharge currents (typically around 100 amps) enable sufficiently high J×B Lorentz-force magnitudes (where J is the current density and B is the magnetic field). Typically, PPTs utilize a capacitor bank for energy storage, which is subsequently converted into kinetic motion, heating, and propellant ionization upon initiation of the discharge. Accordingly, stored energy may be implemented in power-limited nanosatellites for attitude control maneuvers. Another particularly significant benefit to pulsed operation is increased thrust efficiency, enabled by the ability to operate at higher discharge currents without thermal electrode damage. The operation at these higher discharge currents results in an increase in thrust.

Ablative pulsed plasma thrusters (APPTs) typically operate with solid phase propellants such as polytetrafluoroethylene or similar fluorocarbons. Surfaces of these propellants are vaporized with high currents, and the resulting plasma is accelerated to produce thrust. This process places a harsh limit on efficiency (typically $<15\%$)—plagued by late-ablation and the presence of thermally expelled macroparticles. Nonuniform ablation, low mass flow control, and contamination pose further problems to the implementation of APPTs. These disadvantages are often disregarded, however, as high reliability and low tankage fractions often provide an attractive thruster option.

Gas-fed pulsed plasma thrusters (GF-PPTs) pose a stark contrast to APPTs. These variants offer relatively high efficiencies (typically 20-70%) and precision mass flow-control at the cost of complex injection systems. GF-PPTs can strain implementation in satellites which have limited volumetric capabilities, namely CubeSats. Gas injection arrangements also place a mechanical limit on firing frequency due to the limitations imposed by mechanical solenoid valves. Further, difficulties often arise in attempting to establish a desired mass density distribution before ignition—where inductive delay and gas injection must be properly timed.

Liquid-fed pulsed plasma thrusters (LF-PPTs) have been proposed which include two pairs of electrodes. The first pair of electrodes form an igniter assembly that ignites the liquid propellant to form a plasma cloud, and the second pair of electrodes form a Lorentz-force pulsed plasma accelerator that receives and accelerates the plasma cloud generated by the igniter assembly. For example, but not limited to, see U.S. Pat. No. 11,554,883, the disclosure of which is expressly incorporated herein in its entirety by reference.

Although PPTs with solid and gaseous propellants have been employed with limited degrees of success in small spacecraft, simple and robust PPT systems have yet to be developed for such applications. Additionally, proposed PPTs with liquid propellants appear to be overly complex and unreliable. Accordingly, there remains a need for simple and robust PPT systems for use on small, as well as larger, spacecraft applications.

SUMMARY OF THE INVENTION

The present invention overcomes the foregoing problems and other shortcomings, drawbacks, and challenges of spacecraft pulsed plasma thruster systems. While the invention will be described in connection with certain embodiments, it will be understood that the invention is not limited to these embodiments. To the contrary, this invention includes all alternatives, modifications, and equivalents as may be included within the spirit and scope of the present invention. According to one embodiment of the present invention, a conductive liquid-fed pulsed plasma thruster comprises a first electrode having a conductive solid portion and a conductive liquid portion, a second electrode separated from the first electrode to define an ignition space therebetween, at least one electric insulator separating the first and second electrodes, and a conductive-liquid passage extending within the conductive solid portion through which the conductive liquid portion flows from an inlet to an outlet located at the ignition space. The first and second electrodes are configured so that a drop of the conductive liquid forms and grows at the outlet when the conductive liquid flows through the conductive liquid passage until the drop of the conductive liquid causes an arc discharge between the drop and the second electrode to ignite the drop and produce a plasma cloud that generates thrust when exhausted.

According to another embodiment of the present invention, a spacecraft propulsion system comprises a conductive liquid-fed pulsed plasma thruster including a first electrode having a conductive solid portion and a conductive liquid portion, a second electrode separated to define an ignition space therebetween, at least one electric insulator separating the first and second electrodes, and a conductive-liquid passage extending within the conductive solid portion through which the conductive solid portion flows from an inlet to an outlet located at the ignition space. The first and second electrodes are configured so that a drop of the conductive liquid portion forms and grows at the outlet when the conductive liquid portion flows through the conductive liquid passage until the drop of the conductive liquid causes an arc discharge between the drop and the second electrode to ignite the drop and produce a plasma cloud that generates thrust when exhausted. The spacecraft propulsion system also comprises a power source operatively connected to the first and second electrodes, a conductive-liquid reservoir for holding the conductive liquid; and a pump connected in fluidic communication with the conductive-liquid reservoir and the inlet of the first electrode. According to yet another embodiment of the present invention, a method for propelling a spacecraft is provided for a spacecraft including a conductive liquid-fed pulsed plasma thruster comprising a first electrode having a conductive solid portion and a conductive liquid portion, and a second electrode separated from the first electrode to define an ignition space therebetween, at least one electric insulator separating the first and second electrodes, and a conductive-liquid passage extending within the conductive solid portion through which the conductive liquid portion flows from an inlet to an outlet located at the ignition space. The method comprises the steps of forming—a drop of the conductive liquid outside the outlet of the first electrode by supplying the conductive liquid into the inlet of the first electrode, growing the drop of the conductive liquid outside the outlet of the first electrode by continuing to supply the conductive liquid into the inlet of the first electrode until the drop of the conductive liquid causes an arc discharge between the drop of the conductive liquid and the second electrode that ignites the drop of the conductive liquid to produce a plasma cloud that generates thrust when exhausted, and after generating thrust, repeating the steps of forming the drop and growing the drop.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Figure 1:
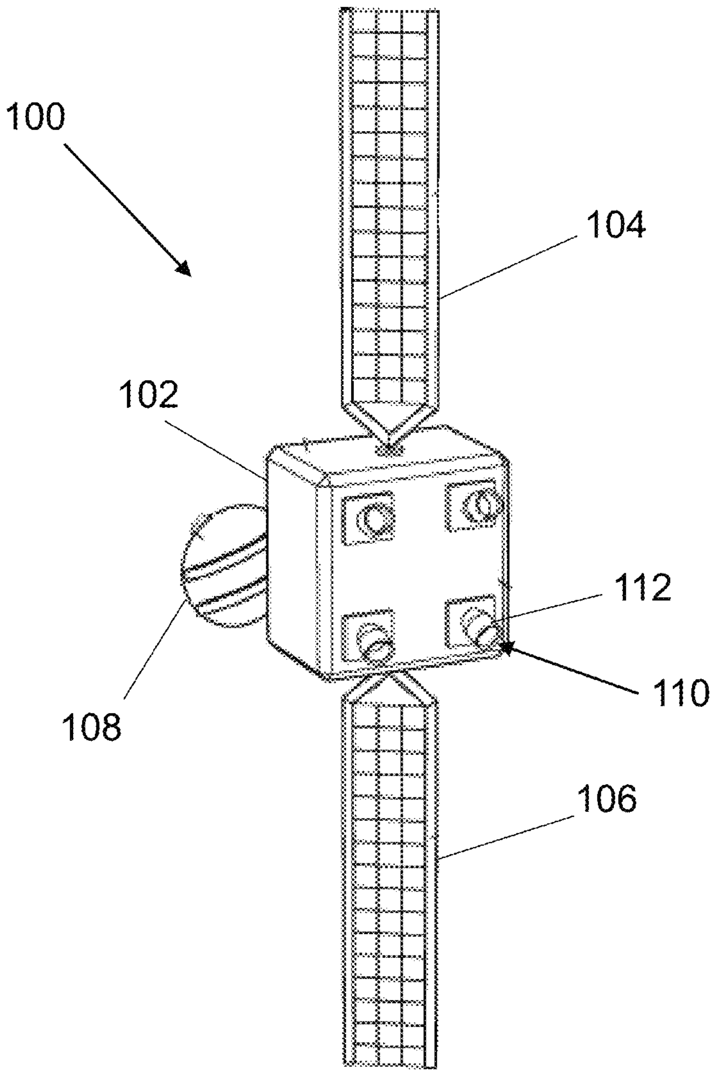
FIG. 1 is a perspective view of an exemplary satellite having a plurality of thrusters according to the present invention.

FIG. 1 illustrates a spacecraft 100 in an exemplary embodiment. The term "spacecraft" is used herein to describe any type of space vehicle in any area of space including, but not limited to, orbital maneuvering, inter planetary travel, and interstellar travel. The illustrated spacecraft 100 is a communications satellite and includes a main body or bus 102 that carries a payload. The illustrated spacecraft 100 also includes solar wings or panels 104, 106 that are attached to the bus 102 and may be used to derive electricity from the sun to power different components on the spacecraft 100. The solar panels 104, 106 can alternatively be eliminated and/or can have any other suitable quantity or configuration. The illustrated spacecraft 100 also includes instruments or subsystems, such as, but not limited to, one or more antennas 108 that may be used for communications. The illustrated spacecraft 100 further includes a propulsion system 110 for orbital station keeping including a plurality of thrusters 112. The term "orbital station-keeping" is used in connection with the illustrated communications satellite to mean keeping the spacecraft 100 at a fixed distance from another spacecraft or celestial body. The orbital station keeping requires a series of orbital maneuvers made with burns of the thrusters 112 to keep the spacecraft 100 in the same orbit as its target orbit. It is noted that for other spacecraft, the propulsion system 110 can be configured for other and/or additional actions. It is also noted that the illustrated spacecraft 100 is exemplary of a suitable spacecraft for application of the present invention only and the spacecraft 100 can alternatively have any other suitable form, purpose, and/or configuration. It is also noted that the illustrated propulsion system 110 on the spacecraft 100 is exemplary of a suitable quantity and location of the thrusters 112 only and the propulsion system 110 can alternatively have a different quantity of the thrusters 112 and/or the thrusters 112 can alternatively be at different locations on the spacecraft 100. It is further noted that the illustrated spacecraft 100 shows all be of the thrusters 112 to be of the same type but the propulsion system 110 can have thrusters 112 of different types.

Figure 2:
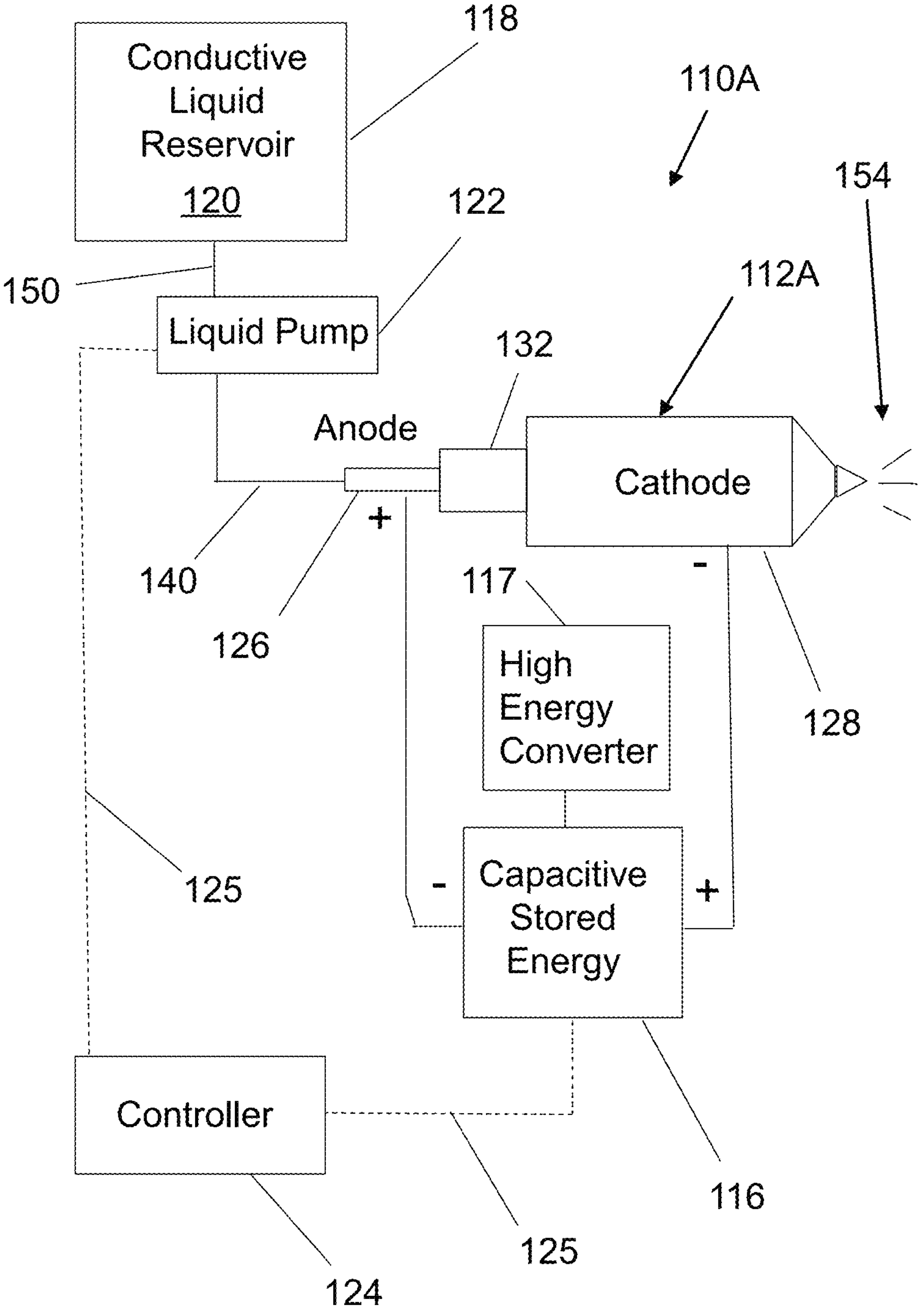
FIG. 2 is a schematic view of a thruster system according to a first embodiment of the present invention.

FIG. 2 illustrates a propulsion 110A system for the spacecraft 100 according to a first embodiment of the present invention. The illustrated propulsion system 110A comprises at least one conductive liquid-fed pulsed plasma thruster (CLF-PPT) 112A, capacitive stored energy 116 operatively connected to the CLF-PPT 112A to power the CLF-PPT 112A, a conductive-liquid reservoir 118 for holding a conductive liquid 120 to be selectively provided to the CLF-PPT 112A, and a pump 122 connected in fluidic communication with the conductive-liquid reservoir 118 and the CLF-PPT 112A to selectively pump the conductive liquid 120 from the reservoir or tank 118 to the CLF-PPT 112A. The illustrated propulsion system 110A also includes a controller 124 operably connected to both the capacitive stored energy 116 and the pump 122 by a wired or wireless connections 125 in order to control operation of the capacitive stored energy 116 and the pump 122 as desired. It is noted that the propulsion system 110A can alternatively have any other suitable configuration such as, for example but not limited to, there can be more than one of CLF-PPT 112A and there can be other types of thrusters 112 included with the CLF-PPT 112A if desired.

Figure 3:
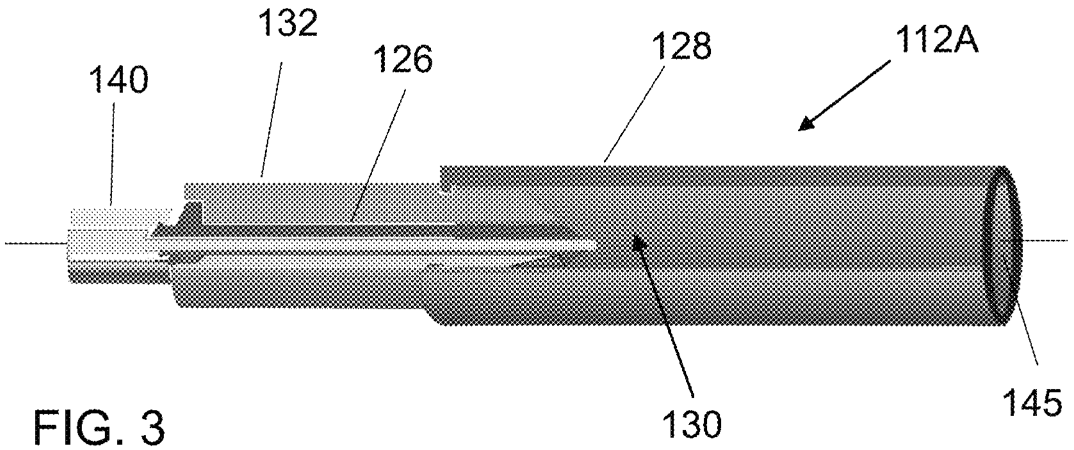
FIG. 3 is a perspective view, partially cut away for clarity, of a conductive liquid fed pulse plasma thruster (CLF-PPT) of the propulsion system of FIG. 2 and wherein a pair of electrodes are coaxially spaced apart and one of the electrodes is in part a liquid sacrificial electrode.

The illustrated CLF-PPT 112A (best shown in FIG. 3) includes first and second electrodes 126, 128 separated to define an ignition space 130 therebetween, and at least one electric insulator 132 separating and electrically isolating the first and second electrodes 126, 128. The illustrated first electrode 126 is configured as a liquid sacrificial electrode while the second electrode 128 is a configured as a solid non-sacrificial electrode.

The illustrated first electrode 126 includes an electrically conductive solid portion 126A and an electrically conductive liquid portion 126B. The illustrated solid portion 126A of the first electrode 126 is a substantially straight and elongate circular tube having a centrally located and substantially straight conductive-liquid passage 134 extending entirely therethrough. A first or rear end of the conductive-liquid passage 134 forms an inlet 136 and a second or front end of the conductive-liquid passage forms an outlet 138. The outlet 138 is located at the ignition space 130. The solid portion 126A of the first electrode 126 can comprise any suitable electrically conductive material such as, for example but not limited to, a metal such as, for example but not limited to, copper or the like. The liquid portion 126B of the first electrode 126 is formed by the conductive liquid 120 located within the conductive liquid passage 134 and any conductive liquid 120 forwardly extending therefrom into the ignition space 130 as described in more detail hereinafter. The illustrated conductive-liquid passage 134 is needle like or elongate so that the liquid portion 126B of the first electrode 126 located therein has a high surface area to volume ratio so that the liquid portion 12B of the first electrode 126 receives an adequate electrical charge from the solid portion 126A of the first electrode 126 which is in contact therewith via the conductive-liquid passage 134. The rear end of the illustrated solid portion 126A of the first electrode 126 is formed to receive an outlet end of a first liquid conduit 140 in a manner that the conductive liquid can flow from the first liquid conduit 140 to the inlet 136 of the conductive liquid passage 134 as described in more detail hereinbelow. It is noted that the first electrode 126 can alternatively have any other suitable configuration or form.

The illustrated at least one insulator 132 is a substantially straight and elongate circular tube having a centrally located and substantially straight passage 142 extending entirely therethrough. The passage 142 is sized and shaped for receiving the solid portion 126A of the first electrode 126 therein. The illustrated insulator 132 is mechanically secured to the solid portion 126A of the first electrode 126 but can be additionally or alternately secured thereto in any other suitable manner. The insulator 126 can comprise any suitable electrically insulating material, that is a dielectric material such as, for example but not limited to, a dielectric ceramic and the like. It is noted that alternatively there can be more than one insulator 132, that is, a plurality of the insulators 132 electrically isolating the second electrode 128 from the first electrode 126. It is also noted that the insulator 132 can alternatively have any other suitable configuration or form.

The illustrated second electrode 128 is a substantially straight and elongate circular tube having a centrally located and substantially straight passage 144 extending entirely therethrough. The passage 144 is sized and shaped for receiving a forward portion of the insulator 132 therein so that the second electrode 128 forwardly extends from the forward end of the isolator 132 in a cantilevered manner and encircles the ignition space 130. The passage 144 has an open forward end 145 in communication with the ignition space 130. The illustrated second electrode 128 is mechanically secured to the isolator 132 but can be additionally or alternately secured thereto in any other suitable manner. The second electrode 128 can comprise any suitable electrically conductive material such as, for example but not limited to, a metal such as, for example but not limited to, copper or the like. It is also noted that the second electrode can alternatively have any other suitable configuration or form.

The illustrated first and second electrodes 126, 128 are thus in a coaxial configuration, that is, a configuration where an arc forms in a radial direction within the ignition space 130 between the free outer end of the conductive liquid portion 126A of the first electrode 126 and an inner contact surface 146 of the second electrode 128 within the second electrode passage 144 at the ignition space 130. The first and second electrodes 126 and 128 are also configured so that a drop 148 of the conductive liquid 120 forms and grows at the outlet 138 of the solid portion 126A of the first electrode 126 as the conductive liquid 120 flows through the conductive liquid passage 134. Once the conductive liquid 120 traverses the solid portion 126A, a droplet or drop 148 forms with its shape constrained by the surface tension of the liquid.

The drop 148 continues to grow until the drop 148 of the conductive liquid 120 grows in the radial direction enough to cause an arc discharge between the first and second electrodes 126, 128. That is, when a part of the drop 148 becomes close enough to the second electrode 128 that the voltage between second electrode 128 and drop 148 exceeds the breakdown voltage of any residual gas or outgassing within the tube-shaped second-electrode 128. The arc of electrons from the second electrode 128 to the drop 148 is struck between the conductive inner surface 146 of second electrode 128 and the liquid surface of the drop 148. This arc deposits electron energy within a thin surface of the droplet material which is heated and vaporizes. As the surface of the drop 148 vaporizes, the vacuum gap fills with conductive plasma facilitating additional ablative energy deposition in the neutral droplet material. The goal is sizing the capacitive stored energy 116 and the high voltage converter 117 to match the deposited energy with the ablative consumption of the droplet material back towards the solid portion 126A of the first electrode 126. That is, depleting the stored the stored energy prior to erosion of solid electrode material (either anode or cathode). In other words, the plasma discharge vaporizes all of the drop 148, but the stored energy is low enough to mitigate solid electrode erosion.

Once the superheated high-density plasma cloud is formed, it expands out of the tubular-shaped second electrode 128 and through the nozzle 145. While the plasma temperature exceeds the melting temperature of the tube wall material of the second electrode 128, rapid expansion and cooling makes the duration of this over-temperature condition brief. The material's thermal inertia is tuned such that the surface of the material can withstand this brief high temperature exposure. As a plasma plume expands down the tubular-shaped second electrode 128 and cools, radiation from within the plasma and from the heated walls of the second electrode 128 is recaptured allowing further acceleration of the cooling plasma. With the high densities encountered in the plasma, rapid recombination occurs within the accelerated flow enabling a primarily neutral high ISP plume to be ejected from the thruster 112A to generate thrust. The tube length of the second electrode 128 is sized to optimize this acceleration while allowing for sufficient blow-down to vacuum conditions to allow for a low enough density such that the vacuum resistivity is sufficient to avoid premature breakdown of the subsequent pulse. This blow-down, in combination with the capacitive stored energy 116 and thermal constraints, determine the maximum sustained repetition rate for the pulse cycle.

It is noted that the first and second electrodes 126, 128 can alternatively have any other suitable configuration. For example, but not limited to, in a coaxial configuration the first electrode 126 can be a solid electrode and the second electrode 128 can be a liquid sacrificial electrode so that a drop 148 of conductive liquid 120 grows radially inward from the second electrode 128 to the first electrode 126. Also, for example but not limited to, when in a coaxial configuration both the first electrode 126 and the second electrode 128 can be liquid sacrificial electrodes so that a pair of drops 148 of conductive liquid 120 grow radially inward toward each other from the first electrode 126 and the second electrode 128.

The capacitive stored energy 116 can be of any suitable type to provide a suitable high-energy voltage difference across the first and second electrodes 126, 128 to operate as described herein. The illustrated capacitive stored energy 116 is a high-voltage capacitor bank for storing energy. The high voltage capacitor bank is initially charged using a DC-DC high energy or boost convertor 117 from available low voltage spacecraft bus. Charging time depends on current and bus current limit boost convertor 117, but these only limit repetition rate rather than other performance parameters of the thrusters 112A. The capacitor bank voltage and capacity are sized to match the desired energy deposition within one ablative pulse of propellant for the target dense plasma slug. It is noted that the high voltage power can alternatively be provided by any other suitable type of power supply.

The capacitive stored energy 116 is electrically connected to the first and second electrodes 126, 128. In the illustrated embodiment a negative terminal of the capacitive stored energy 116 is operably connected to the first electrode 126 and a positive terminal of the capacitive stored energy 116 is operably connected to the second electrode 128. Thus, the first electrode 126 operates as the anode and the second electrode 128 operates as the cathode. It is noted, however, that the polarity can be reversed if desired. In this case the positive terminal of the capacitive stored energy 116 is operably connected to the first electrode 126 and the negative terminal of the capacitive stored energy 116 is operably connected to the second electrode 128. Thus, the first electrode 126 operates as the cathode and the second electrode 128 operates as the anode. It is noted that the power source can alternatively have any other suitable configuration.

The illustrated conductive-liquid reservoir or tank 118 forms an enclosed interior space for storing a suitable quantity of the conductive liquid 120. The reservoir 118 can be formed of any suitable material. An outlet of the conductive liquid reservoir 118 is in fluidic communication with an inlet of the pump 122 via a second liquid conduit 150. The second liquid conduit 150 can be of any suitable type. It is noted that the conductive liquid reservoir 118 can alternatively have any other suitable configuration.

The conductive liquid 120 preferably has a low vapor pressure and can be of any suitable type which performs as described herein. The vapor pressure preferably is low enough that the arc does not break down prematurely and too much mass is not lost to make the thruster 112A inefficient. This may not be required if a lossy liquid is utilized. The conductive liquid 120 can be, for example but not limited to, (1) an ionic liquid such as, for example but not limited to 1-ethyl-3-methylimidazolium tetrafluoroborate (EMI-$BF_4$), and the like, (2) an energetic liquid or propellant such as, for example but not limited to, Advanced Spacecraft Energetic Non-Toxic (ASCENT) formerly known as AF-M315D, hydrazine, and the like, or (3) a liquid metal such as, for example but not limited to lithium, mercury, and the like.

The pump 122 can be of any suitable type for pumping the conductive liquid 120 from the conductive liquid reservoir 118 to the CLF-PPT 112A during operation of the CLF-PPT 112A. The pump 122 can be, for example but not limited to, a needle pump, syringe pump, infusion pump, and the like. An inlet of the pump 122 is in fluidic communication with the outlet of the conductive liquid reservoir 118 via the second liquid conduit 150. An outlet of the illustrated pump 122 is in fluidic communication with the inlet 136 of the first electrode 126 via the first liquid conduit 140. It is noted that the pump 122 can alternatively have any other suitable configuration.

The controller 124 comprises suitable processors and memory and is programmed for operating the components of the propulsion system 110A as described herein. The controller 124 can be a stand-alone component or part of a larger controller/computer of the spacecraft 100. The illustrated controller 124 is in operable communication with the capacitive stored energy 116 and the pump 122. The illustrated controller 124 is configured to operate the capacitive stored energy 116 to provide voltage to the first and second electrodes as needed. The illustrated controller 124 is also configured to operate the pump 122 as needed to provide the conductive liquid 120 to the CLF-PPT 112A as needed to fire the CLF-PPT 112A as needed. It is noted that the controller 124 can alternatively or additionally be configured to operate any other components as needed. It is also noted that the illustrated propulsion system 110A is simplified compared to the prior art propulsion systems because an igniter system is not required, and a switching system is not required.

Figure 4A:
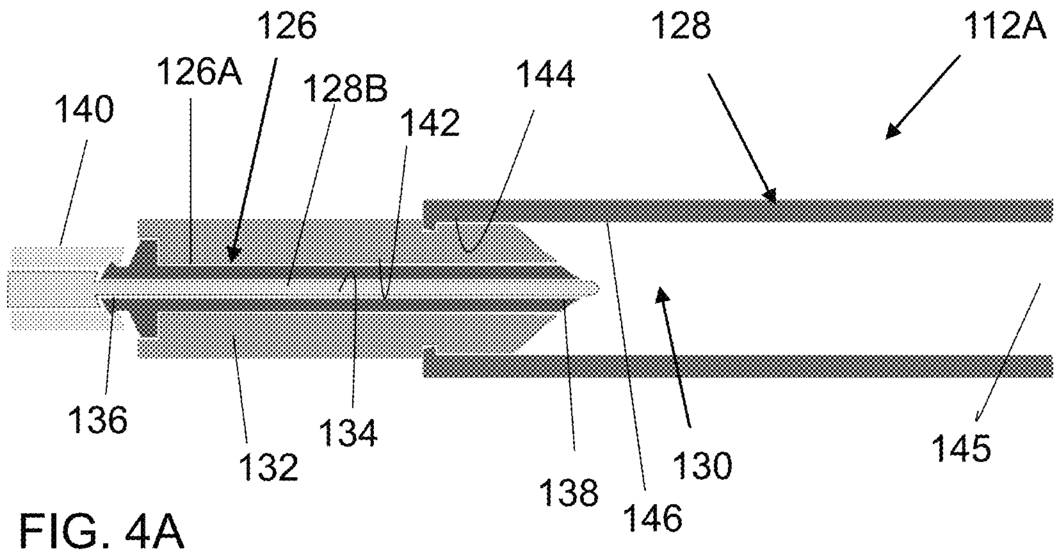
FIG. 4A is a side cross-sectional view of the CLF-PPT of FIGS. 2 and 3 with a conductive liquid forming the liquid sacrificial electrode.
Figure 4B:
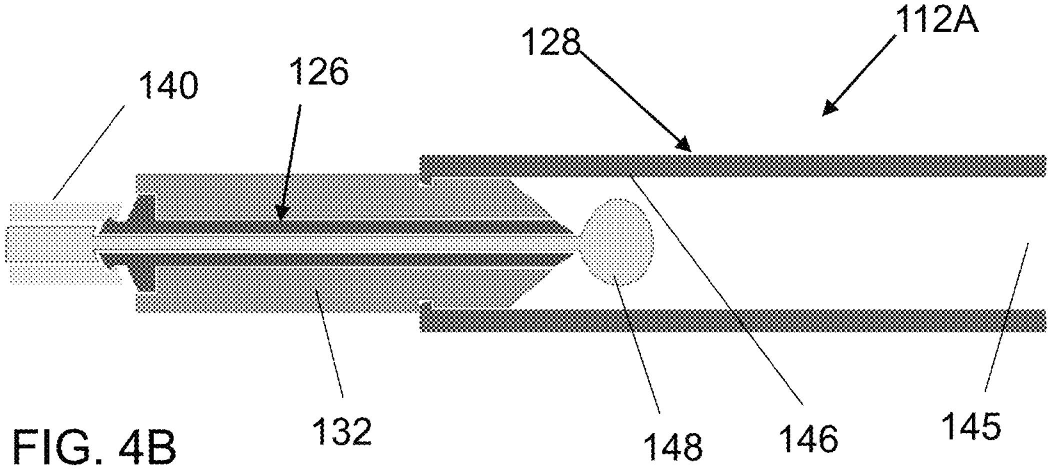
FIG. 4B is a side cross-sectional view of the LF-PPT of FIG. 4A after a drop of conductive liquid begins to form at a free end of the liquid sacrificial electrode.
Figure 4C:
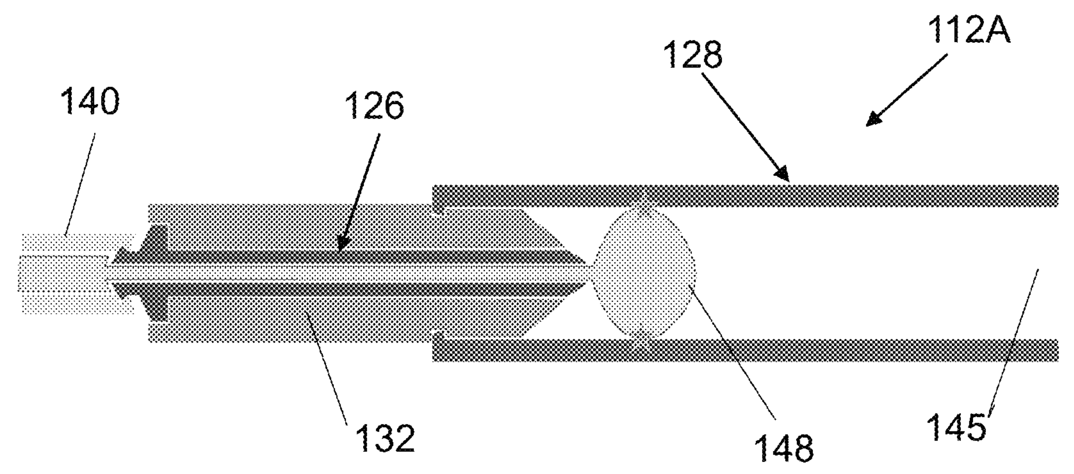
FIG. 4C is a side cross-sectional view of the CLF-PPT of FIGS. 4A and 4B after the drop of conductive liquid has grown enough that an arc strikes between the electrodes.
Figure 4D:
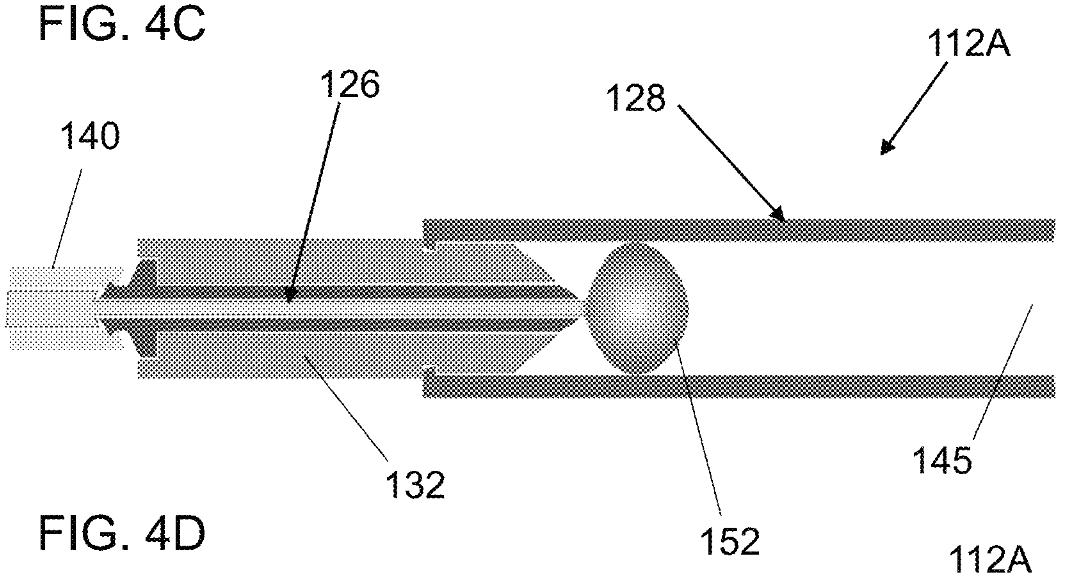
FIG. 4D is a side cross-sectional view of the CLF-PPT of FIGS. 4A to 4C after the drop of conductive liquid has formed a plasma cloud.
Figure 4E:
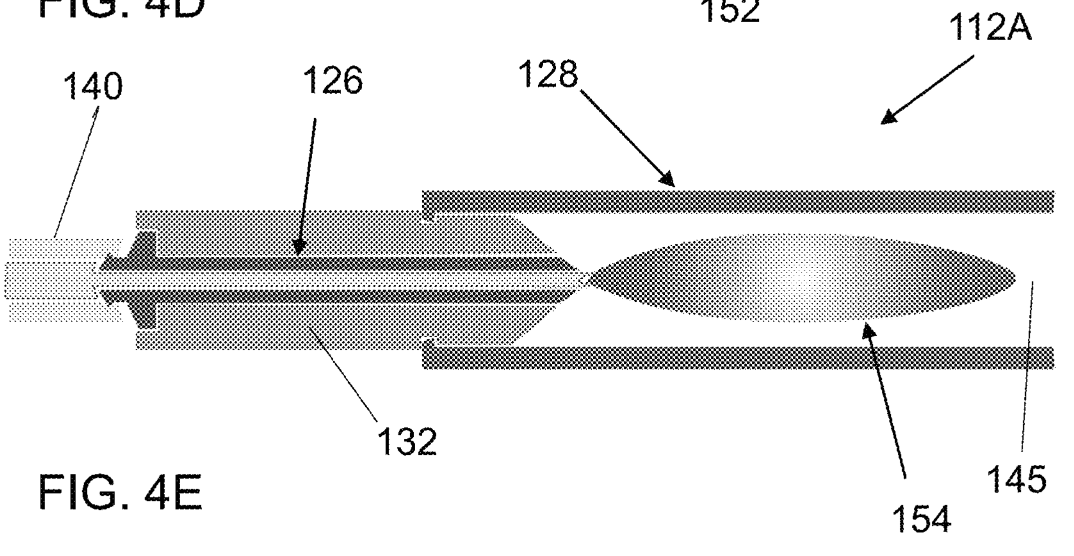
FIG. 4E is a side cross-sectional view of the CLF-PPT of FIGS. 4A to 4D as the plasma cloud is accelerated to form an exhaust plume as it is linearly exhausted from the CLF-PPT to provide thrust.

FIGS. 4A to 4E illustrate operation of the CLF-PPT 112A of the first embodiment of the present invention. FIG. 4A shows the CLF-PPT 112A as the conductive liquid 120 is flowing into the conductive liquid passage 134 and begins to extend out of the outlet 138 of the conductive liquid passage 134. The solid portion 126B of the first electrode 126 is energized by the capacitive stored energy 116. The conductive liquid portion 126B is in contact with the solid portion 126B of the first electrode 126 so it is also energized. FIG. 4B shows that as the conductive liquid 120 continues to be pumped into the CLF-PPT 112A, the free drop 148 forms at the end of the conductive liquid 120 in the ignition space 130 outside of the outlet 138 of the conductive liquid passage 134. FIG. 4C shows that as the conductive liquid 120 continues to be pumped into the CLF-PPT 112A, the free drop 148 continues to grow until it grows enough in the radial direction that it is close enough to the inner contact surface 146 of the second electrode that it ignites by arcs formed in the radial direction between the drop 148 and the inner contact surface 146 of the second electrode 128. FIG. 4D shows that this ignition of the drop 148 of conductive liquid 120 causes a plasma cloud 152 to form in the ignition space 130. FIG. 4E shows the plasma cloud 152 being accelerated by Lorentz forces perpendicular to the direction of the arc to form an exhaust plume 154 as it is linearly exhausted out of the open forward end 145 of the second electrode 128 to provide thrust. Once exhausted, the sequences of events repeats beginning back at FIG. 4A thus causing pulsed operation of the CLF-PPT 112A. It is noted that due to this repeated explosive ablation of the conductive liquid portion 126B of the first electrode 126, pulsing action occurs naturally and thus no switching electronics are required.

Figure 5:
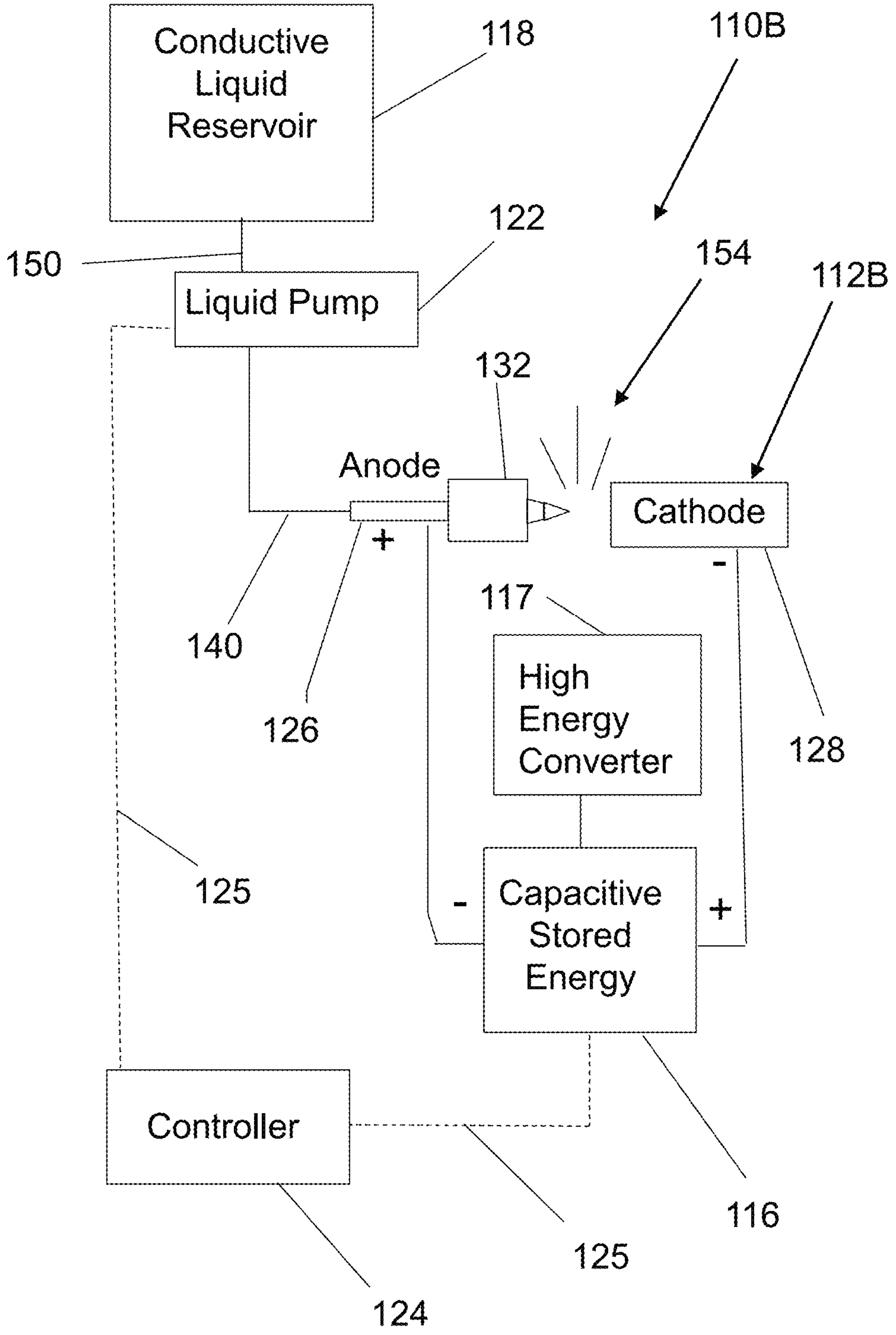
FIG. 5 is a block diagram of a propulsion system according to a second embodiment of the present invention.

FIG. 5 illustrates a propulsion system 110B for the spacecraft 100 according to a second embodiment of the present invention. The propulsion system 110B according to the second embodiment of the present invention is substantially the same as the above-described propulsion system 110A according to the first embodiment of the present invention except that the CLF-PPT 112B of the second embodiment of the invention is configured different than the CLF-PPT 112A of the first embodiment of the present invention.

Figure 6:
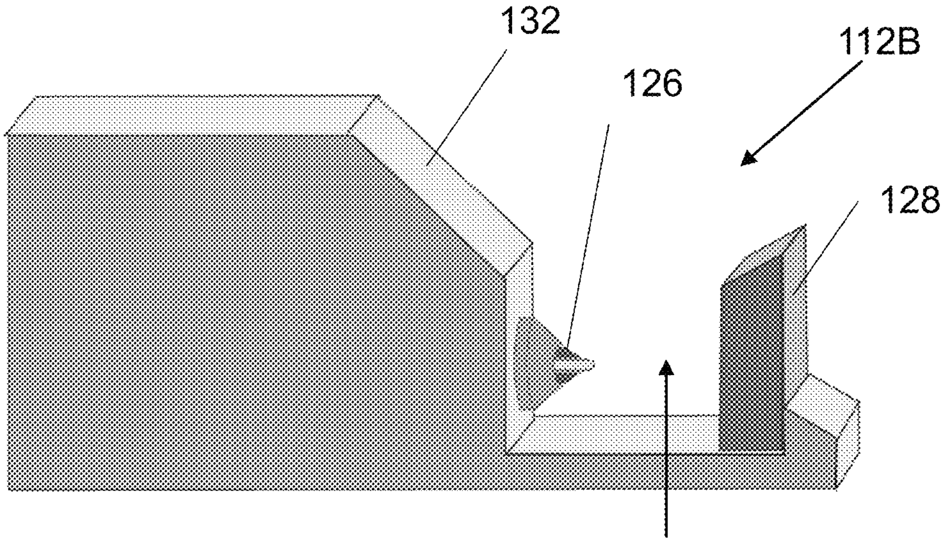
FIG. 6 is a perspective view of a CLF-PPT of the propulsion system of FIG. 5 wherein a pair of electrodes are linearly spaced apart and one of the electrodes is at least partially a liquid sacrificial electrode.

FIG. 6 illustrates the CLF-PPT 112B of the second embodiment of the present invention. The CLF-PPT 112B according to the second embodiment of the present invention is substantially the same as the above-described CLF-PPT 112A according to the first embodiment of the present invention except that the CLF-PPT 112B of the second embodiment of the invention includes a second electrode 128 having different shape than the second electrode 128 of the first embodiment of the present invention. Also, the first and second electrodes 126, 128 of the second embodiment of the present invention are configured in a linear manner rather than the coaxial manner of the first embodiment of the present invention. As a result, the at least one insulator 132 also has a different shape in order to electrically isolate the first and second electrodes 126, 128.

The second electrode 128 is a body of suitable material having a planar contact surface 156. The illustrated second electrode 12SB is generally shaped as a rectangular block but any other suitable shape can alternatively be utilized. It is noted that the planar contact surface 156 can also have any other suitable shape. The second electrode 128 is positioned so that the planar contact surface 156 is spaced-apart from and facing the conductive liquid passage outlet 138 of the first electrode 126. Thus, the planar contact surface 156 is substantially perpendicular to the direction of travel of the conductive liquid 120 exiting the conductive liquid passage outlet 138 of the first electrode 126. As the drop 148 of conductive liquid 120 forms and grows, it ignites once it has sufficiently grown in the linear direction toward the contact surface 156 of the second electrode 128 to cause an arc therebetween.

Figure 7A:
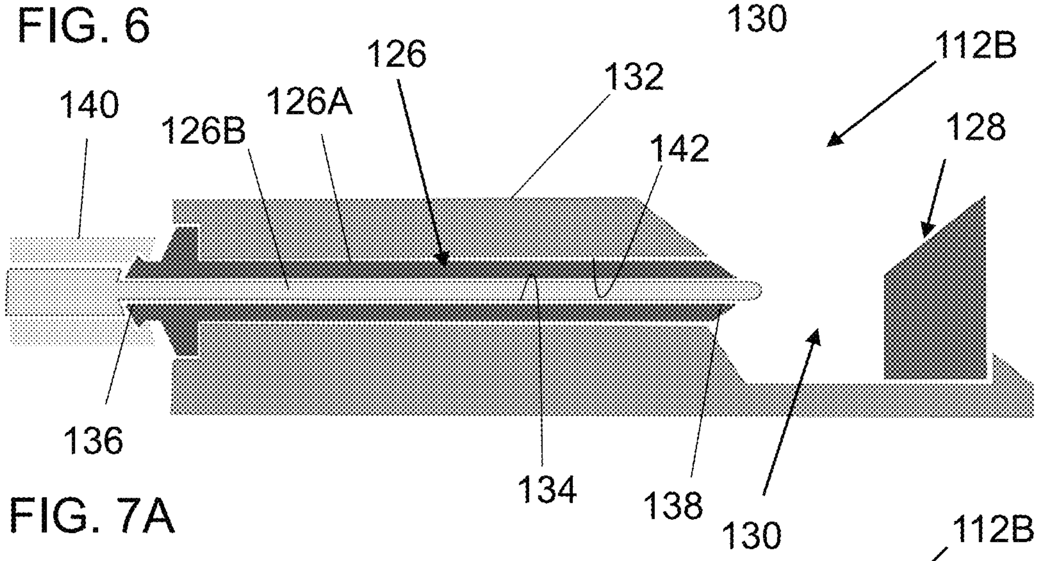
FIG. 7A is a side cross-sectional view of the CLF-PPT of FIGS. 5 and 6 with a conductive liquid forming the liquid sacrificial electrode.
Figure 7B:
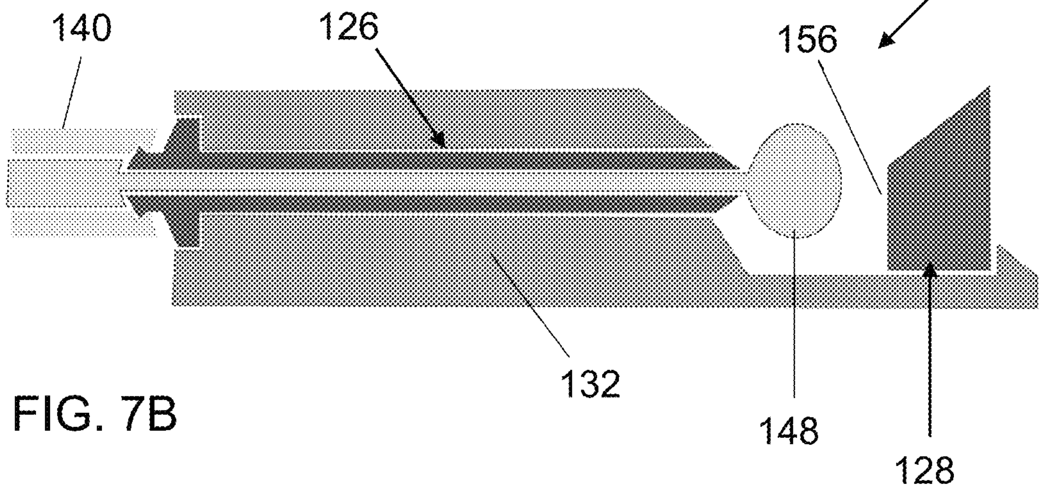
FIG. 7B is a side cross-sectional view of the CLF-PPT of FIG. 7A after a drop of conductive liquid begins to form at a free end of the liquid sacrificial electrode.
Figure 7C:
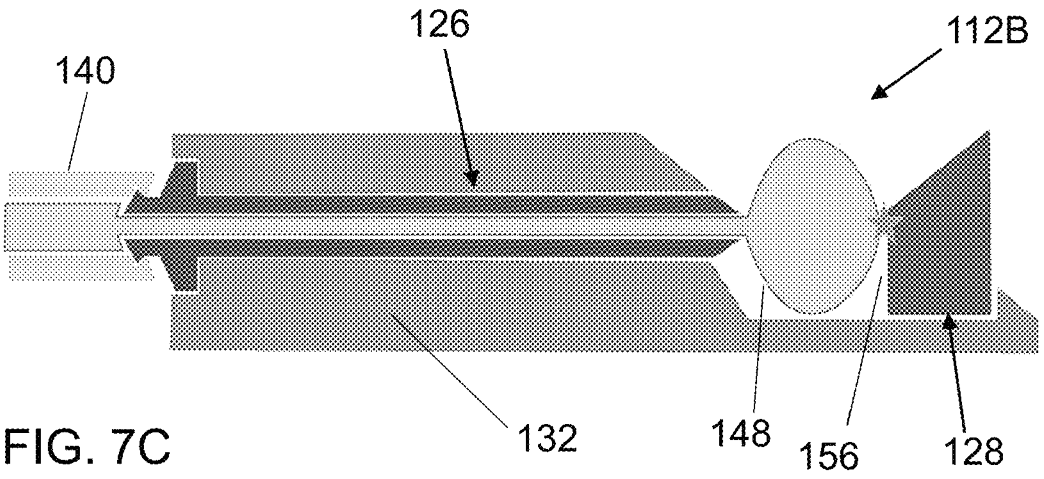
FIG. 7C is a side cross-sectional view of the CLF-PPT of FIGS. 7A and 7B after the drop of conductive liquid has grown enough that an arc strikes between the electrodes.
Figure 7D:
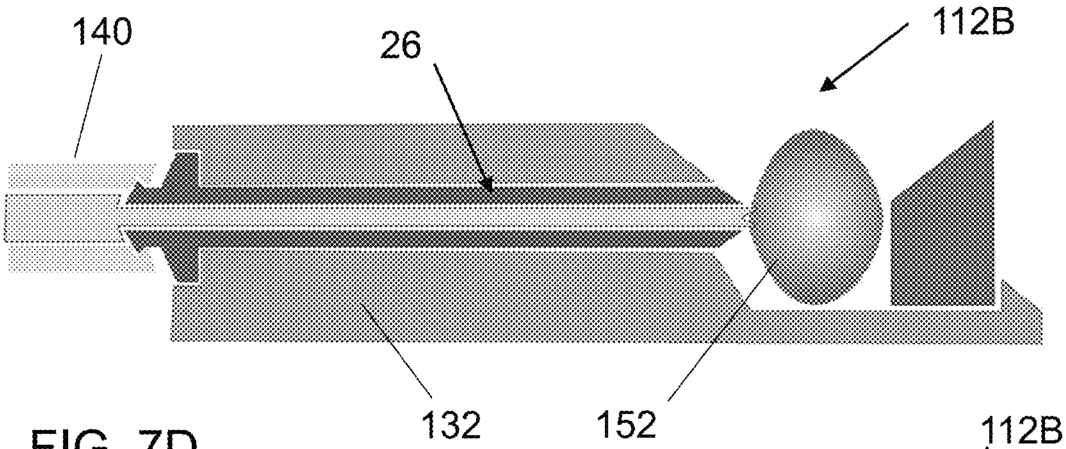
FIG. 7D is a side cross-sectional view of the CLF-PPT of FIGS. 7A to 7C after the drop of conductive liquid has formed a plasma cloud.
Figure 7E:
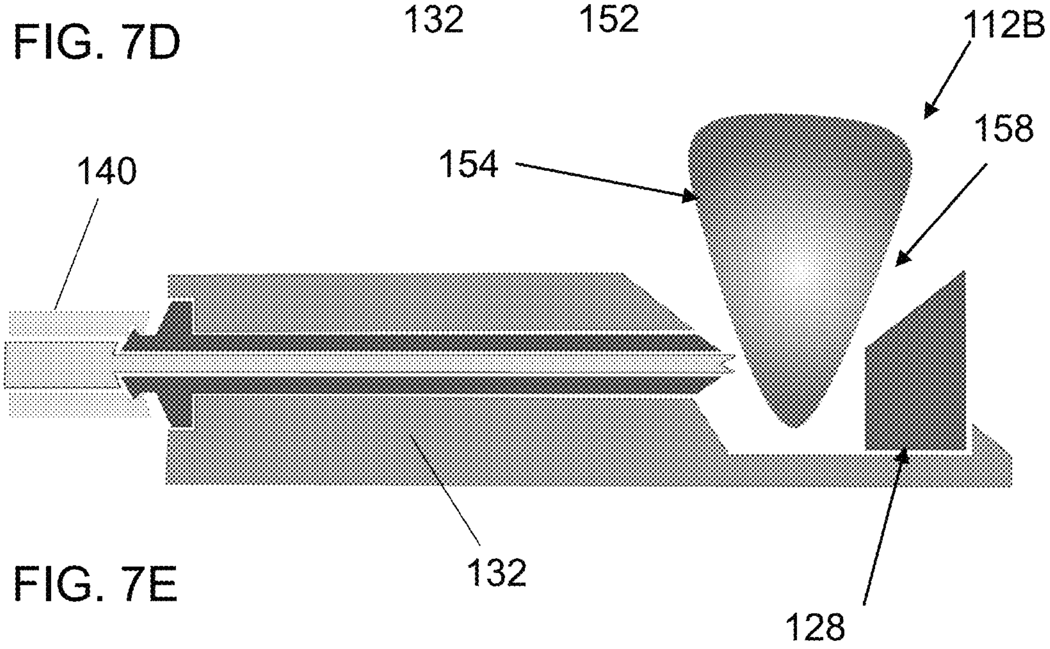
FIG. 7E is a side cross-sectional view of the CLF-PPT of FIGS. 7A to 7D as the plasma cloud is accelerated to form an exhaust plume as it is perpendicularly exhausted from the CLF-PPT to provide thrust.

FIGS. 7A to 7E illustrate operation of the CLF-PPT 112B according to the second embodiment of the present invention. FIG. 7A shows the CLF-PPT 112B as the conductive liquid 120 is flowing into the conductive liquid passage 134 and begins to extend out of the outlet 138 of the conductive liquid passage 134. The solid portion 126B of the first electrode is energized by the capacitive stored energy 116. The conductive liquid portion 126B is in contact with the solid portion 126B of the first electrode 126 so it is also energized. FIG. 7B shows that as the conductive liquid 120 continues to be pumped into the CLF-PPT 112B, the free drop 148 forms at the end of the conductive liquid 120 in the ignition space 130 outside of the outlet 138 of the conductive liquid passage 134. FIG. 7C shows that as the conductive liquid 120 continues to be pumped into the CLF-PPT 112B, the free drop 148 continues to grow until it grows enough in the linear direction that it is close enough to the planar contact surface 156 of the second electrode 128 that it ignites by an arc formed in the linear direction between the drop 148 and the planar contact surface 156 of the second electrode 128. FIG. 7D shows that this ignition of the drop 148 of conductive liquid 120 causes a plasma cloud 152 to form in the ignition space 130. FIG. 7E shows the plasma cloud 152 being accelerated by Lorentz forces perpendicular to the direction of the arc to form an exhaust plume 154 as it is perpendicularly exhausted out of the open side 158 between the first and second electrodes 126, 128 to provide thrust. Once exhausted, the sequences of events repeats beginning back at FIG. 7A thus causing pulsed operation of the CLF-PPT 112B. It is noted that due to this repeated explosive ablation of the conductive liquid portion 126B of the first electrode 126, pulsing action occurs naturally and thus no switching electronics are required.

Figure 8:
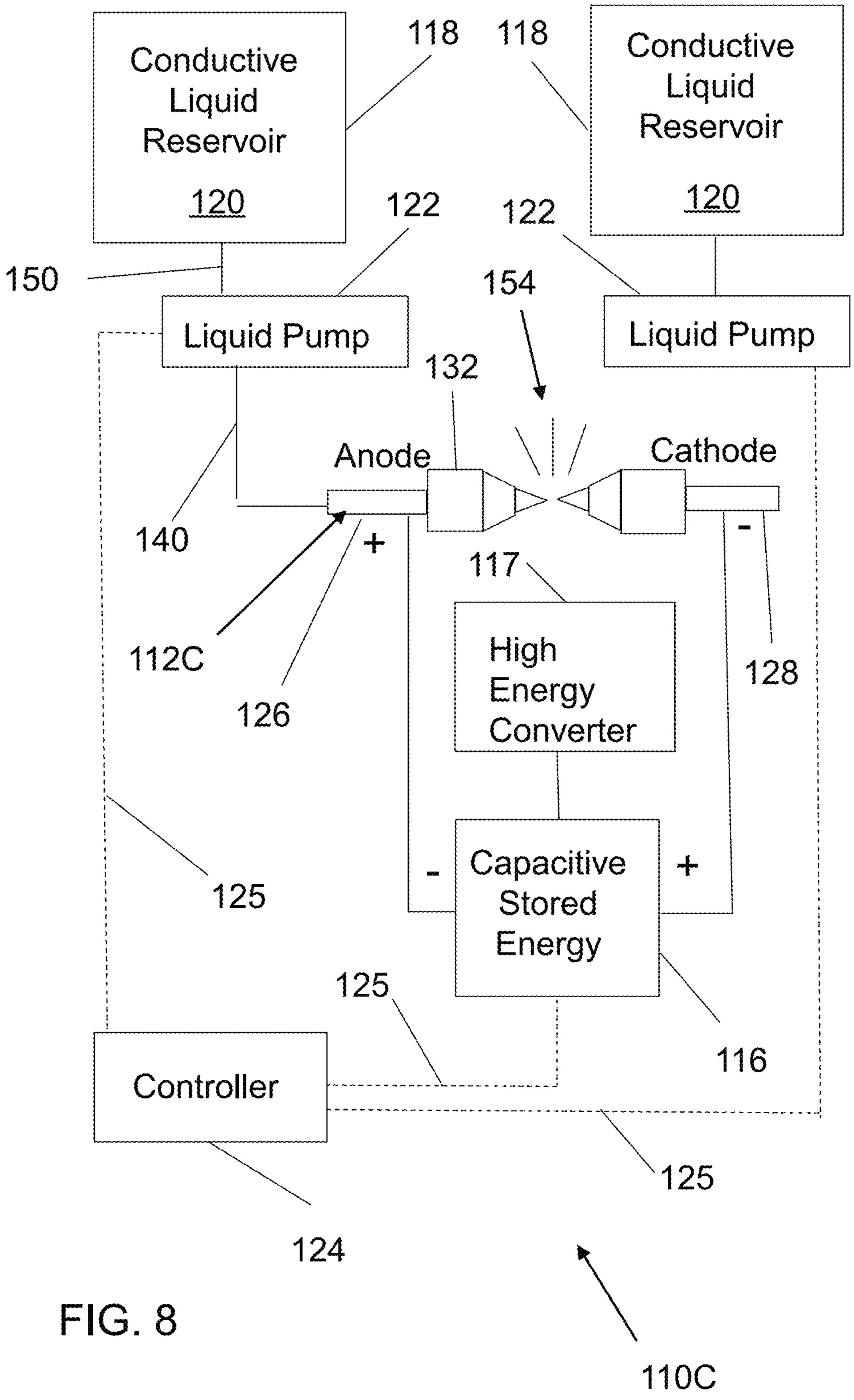
FIG. 8 is a block diagram of a propulsion system according to a third embodiment of the present invention.

FIG. 8 illustrates a propulsion system 110C for the spacecraft 100 according to a third embodiment of the present invention. The propulsion system 110C according to the third embodiment of the present invention is substantially the same as the above-described propulsion systems 110A. 110B according to the first and second embodiments of the invention except that the CLF-PPT 112C of the third embodiment of the present invention is configured different than the CLF-PPTs 112A and 112B of the first and second embodiments of the present invention and the first and second electrodes 126, 128 are provided with separate conductive liquid reservoirs 118 and pumps 122. Separate conductive liquid reservoirs 118 and pumps 122 are utilized to isolate the first and second electrodes 126 and 128. A single conductive liquid reservoir 118 and/or pump 122 can alternatively be utilized if the first and second electrodes 126, 128 are isolated by other means such as, for example but limited to, sufficiently insulating separate pumps 122.

Figure 9:
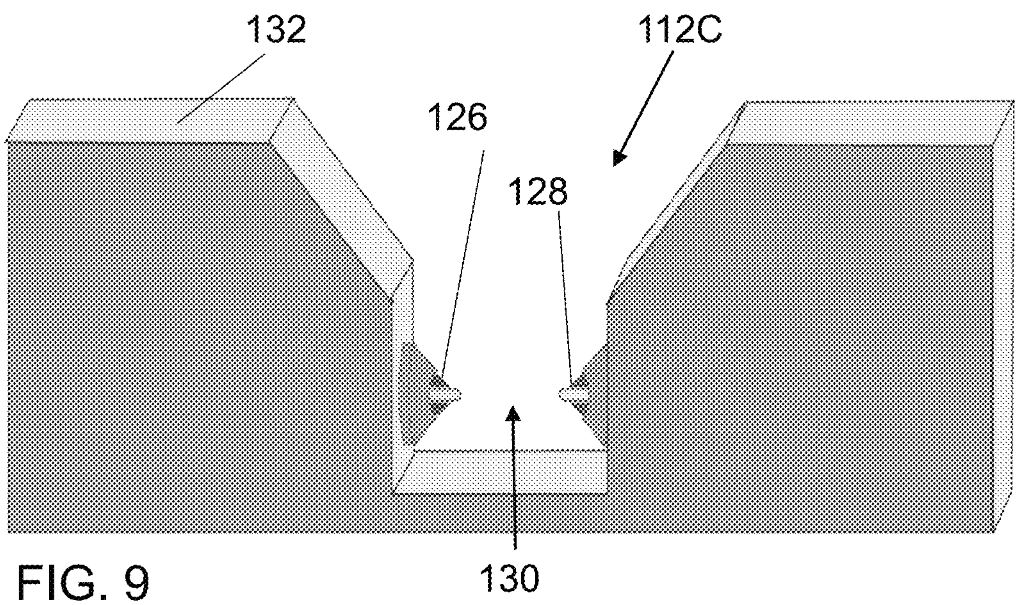
FIG. 9 is a perspective view of a CLF-PPT of the propulsion system of FIG. 8 wherein a pair of electrodes are linearly spaced apart and each of the electrodes are at least in part a liquid sacrificial electrode.

FIG. 9 illustrates the LF-PPT 112C of the third embodiment of the present invention. The CLF-PPT 112C according to the third embodiment of the present invention is substantially the same as the above-described CLF-PPT 112B according to the second embodiment of the present invention except that the CLF-PPT 112C of the third embodiment of the invention includes a second electrode 128 having a different configuration than the second electrode 128 of the second embodiment of the present invention. As a result, the at least one insulator 132 also has a different shape in order to electrically isolate the first and second electrodes 126, 128.

The second electrode 128 is configured as a liquid sacrificial electrode like the first electrode 126 having a conductive solid portion 128A and a conductive liquid portion 128B. Both the first and second electrodes 126, 128 are provided with the conductive liquid 120 by the pump 122 via the first liquid conduits 140. It is noted that alternatively a second pump could be utilized 122. The second electrode 128 is spaced apart from and facing the first electrode 126 so that the conductive liquid passages 134 are coaxial. Thus, the direction of travel of the conductive liquid 120 exiting the conductive liquid passage outlets 138 of the two first electrodes 126 are directly opposed to one another. That is, aligned on a collision course. As the drops 148 of conductive liquid 120 form and grow toward one another, they each ignite once they have sufficiently grown in the linear direction toward one another to cause an arc therebetween.

Figure 10A:
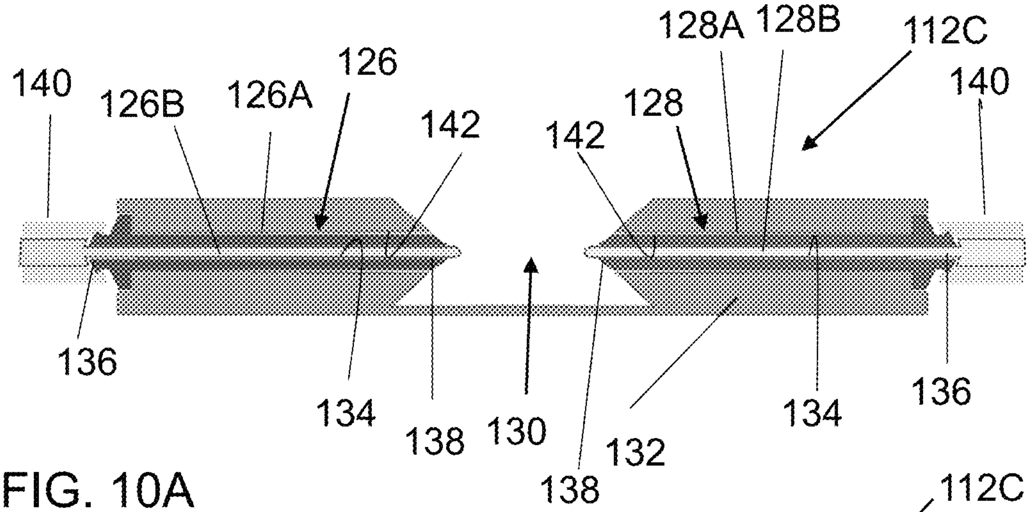
FIG. 10A is a side cross-sectional view of the CLF-PPT of FIGS. 8 and 9 with a conductive liquid forming the two liquid sacrificial electrodes.
Figure 10B:
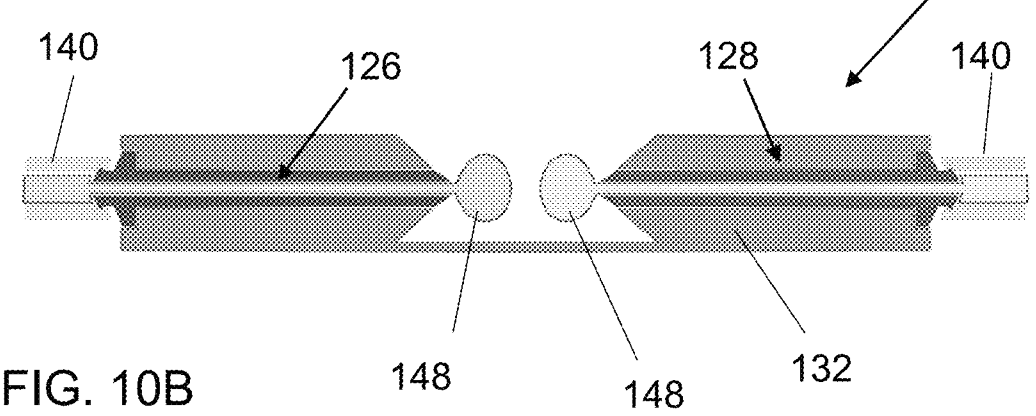
FIG. 10B is a side cross-sectional view of the CLF-PPT of FIG. 10A after drops of conductive liquid begin to form at free ends of the liquid sacrificial electrodes.
Figure 10C:
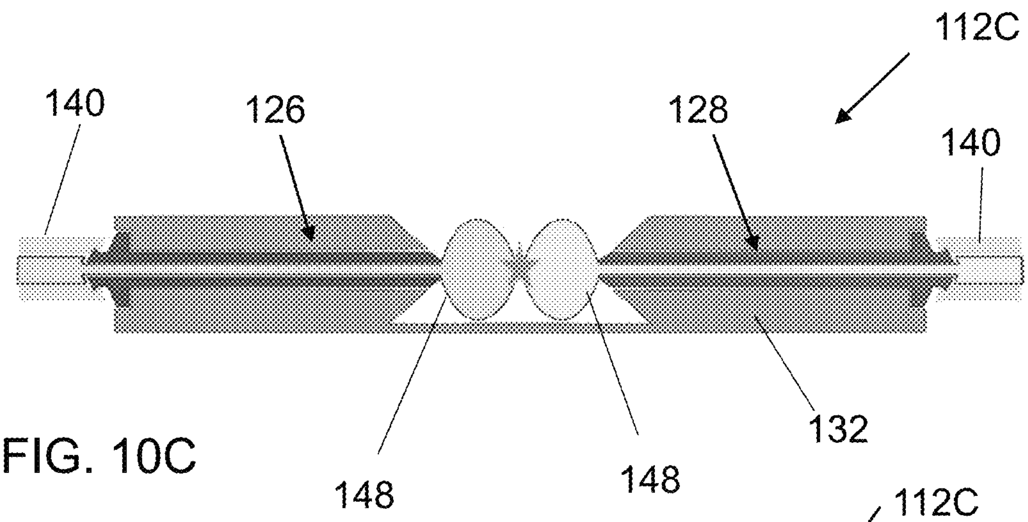
FIG. 10C is a side cross-sectional view of the CLF-PPT of FIGS. 10A and 10B after the drops of conductive liquid have grown enough that an arc strikes between the electrodes.
Figure 10D:
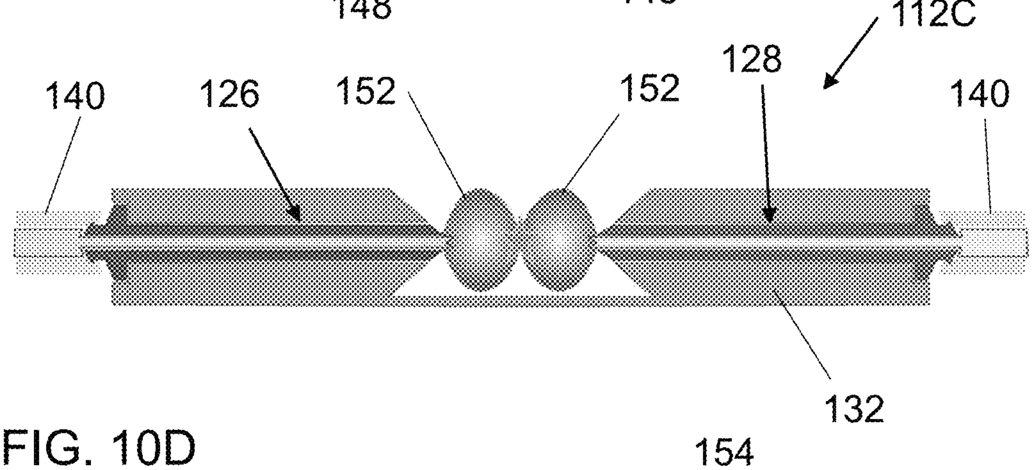
FIG. 10D is a side cross-sectional view of the CLF-PPT of FIGS. 10A to 10C after the drops of conductive liquid have each formed a plasma cloud.
Figure 10E:
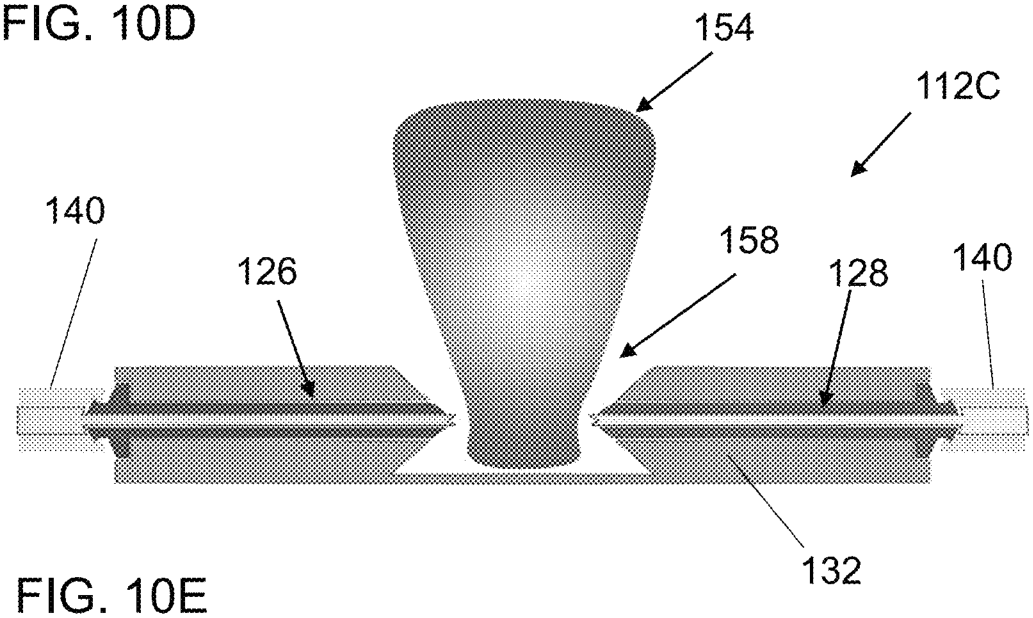
FIG. 10E is a side cross-sectional view of the CLF-PPT of FIGS. 10A to 10D as the plasma clouds are accelerated to form an exhaust plume as they are perpendicularly exhausted from the CLF-PPT to provide thrust.

FIGS. 10A to 10E illustrate operation of the CLF-PPT 112C according to the third embodiment of the present invention. FIG. 10A shows the CLF-PPT 112C as the conductive liquid 120 is flowing into the conductive liquid passage 134 and begins to extend out of the outlet 138 of the conductive liquid passage 134 of each of the first and second electrodes 126, 128. The solid portions 126A of the first electrodes 126 are energized by the capacitive stored energy 116. The conductive liquid portions 126B are in contact with the solid portions 126A of the first electrodes 126 so they are also energized. FIG. 10B shows that as the conductive liquid 120 continues to be pumped into the CLF-PPT 112C, the free drops 148 form at the ends of the conductive liquid 120 in the ignition space 130 between the outlets 138 of the conductive liquid passages 134. FIG. 10C shows that as the conductive liquid 120 continues to be pumped into the CLF-PPT 112C, the free drops 148 continue to grow until they grow toward each other enough in the linear direction that that they are close enough together that they ignite by an arc formed in the linear direction between the drops 148. FIG. 10D shows that this ignition of the drops 148 of conductive liquid 120 cause plasma clouds 152 to form in the ignition space 130. FIG. 10E shows the plasma clouds 152 being combined and accelerated by Lorentz forces perpendicular to the direction of the arc to form an exhaust plume 154 as it is perpendicularly exhausted out of the open side 158 between the first and second electrodes 126, 128 to provide thrust. Once exhausted, the sequence of events repeats beginning back at FIG. 10A thus causing pulsed operation of the CLF-PPT 112C. It is noted that due to this repeated explosive ablation of the conductive liquid portions 126C of the first electrodes 126, pulsing action occurs naturally and thus no switching electronics are required.

Figure 11:
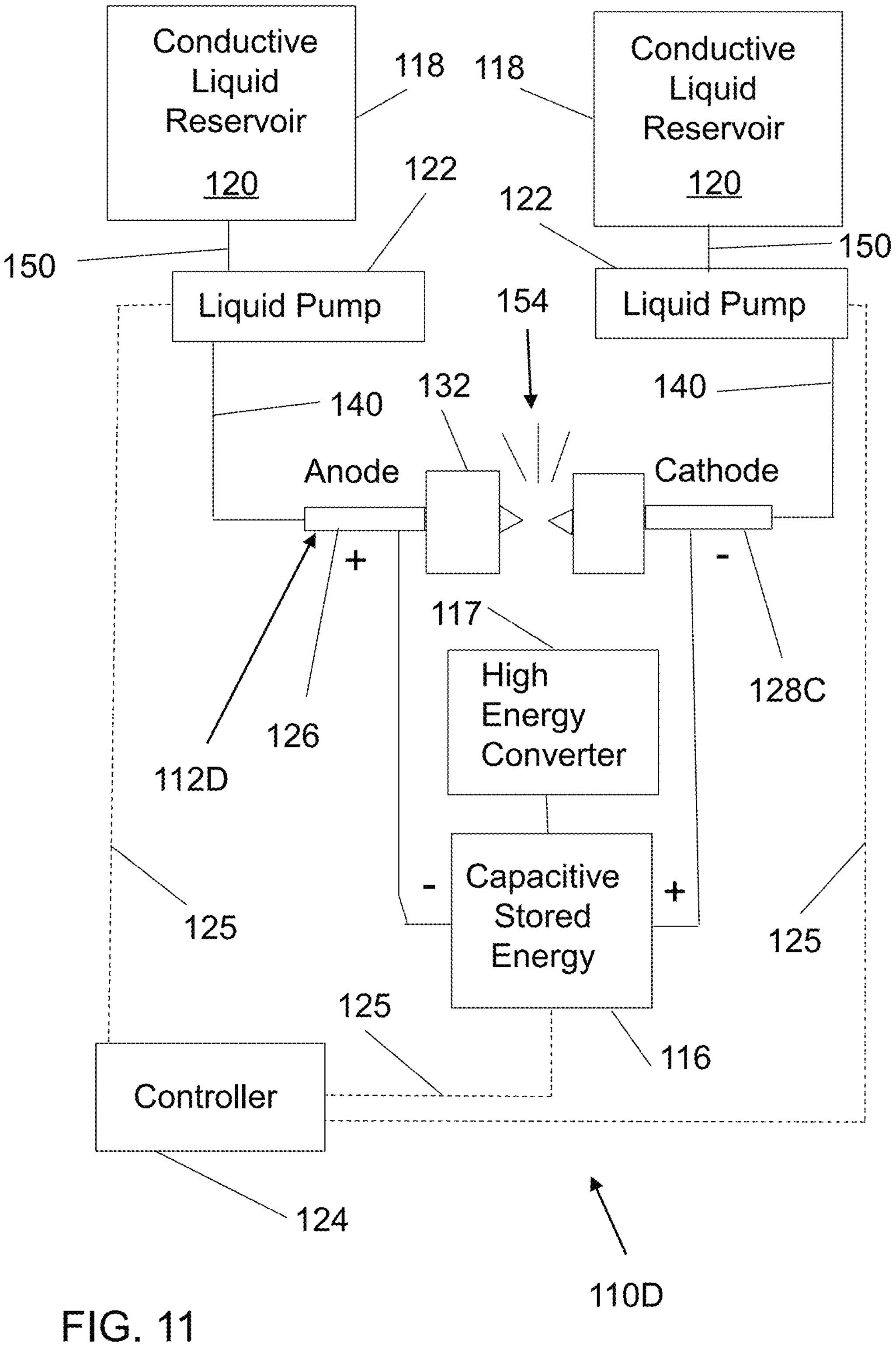
FIG. 11 is a block diagram of a propulsion system according to a fourth embodiment of the present invention.

FIG. 11 illustrates a propulsion system 110D for the spacecraft 100 according to a fourth embodiment of the present invention. The propulsion system 110D according to the fourth embodiment of the present invention is substantially the same as the above-described propulsion system 110C according to the third embodiment of the invention except that the CLF-PPT 112D of the fourth embodiment of the present invention is configured different than the CLF-PPT 112C of the third embodiment of the present invention.

Figure 12:
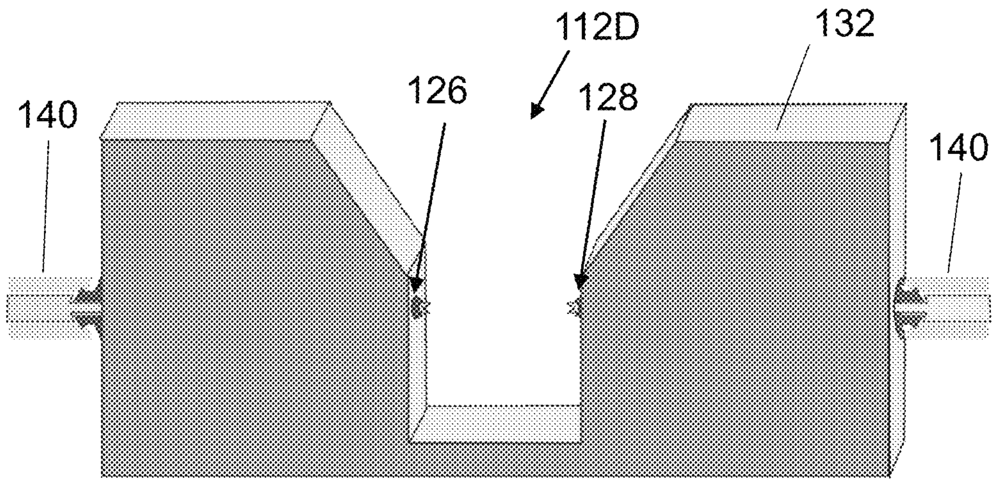
FIG. 12 is a perspective view of a CLF-PPT of the propulsion system of FIG. 11 wherein a pair of electrodes are linearly spaced apart, ends of the electrodes are at walls of an insulator, and each of the electrodes are at least in part a liquid sacrificial electrode.

FIG. 12 illustrates the CLF-PPT 112D of the fourth embodiment of the invention. The CLF-PPT 112D according to the fourth embodiment of the present invention is substantially the same as the above-described CLF-PPT 112C according to the third embodiment of the present invention except that the insulator 132 of the fourth embodiment of the invention has a different configuration.

The insulator 132 of the fourth embodiment of the present invention is provided with planar wetting walls 160 located adjacent to the outlets 138 of the conductive liquid passages 134 and perpendicular to the outlets 138 of the conductive liquid passages 134. The wetting walls 160 are configured and positioned so that the drops 148 form along the wetting walls 160 and "wet" the walls 160. The drop 148 forms with its shape constrained by the surface tension of the liquid and liquid-solid wetting angle. The wetting wall 160 support the drops 148 unlike the unsupported free drops 148 of the first and second embodiments. The wetting walls 160 can be of any suitable size and can alternatively have any other suitable configuration.

Figure 13A:
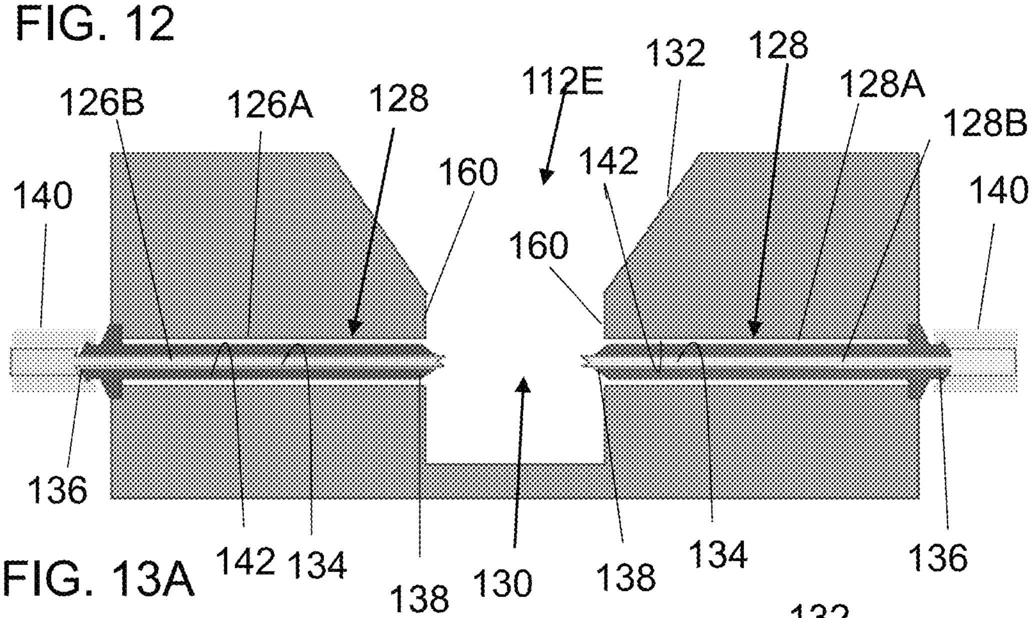
FIG. 13A is a side cross-sectional view of the CLF-PPT of FIGS. 11 and 12 with a conductive liquid forming the two liquid sacrificial electrodes.
Figure 13B:
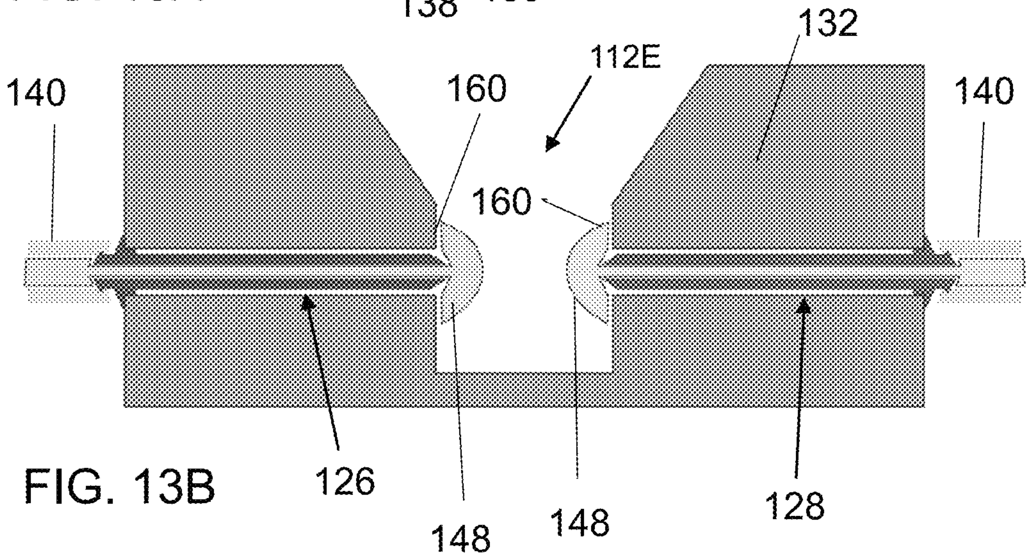
FIG. 13B is a side cross-sectional view of the CLF-PPT of FIG. 13A after drops of conductive liquid begin to form at ends of the liquid sacrificial electrodes and along the insulator walls.
Figure 13C:
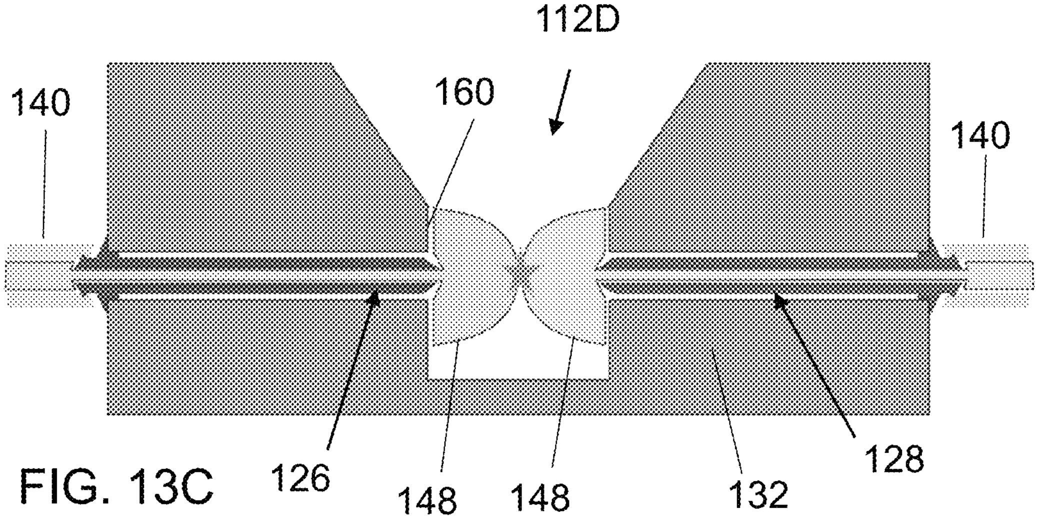
FIG. 13C is a side cross-sectional view of the CLF-PPT of FIGS. 13A and 13B after the drops of conductive liquid have grown enough that an arc strikes between the electrodes.
Figure 13D:
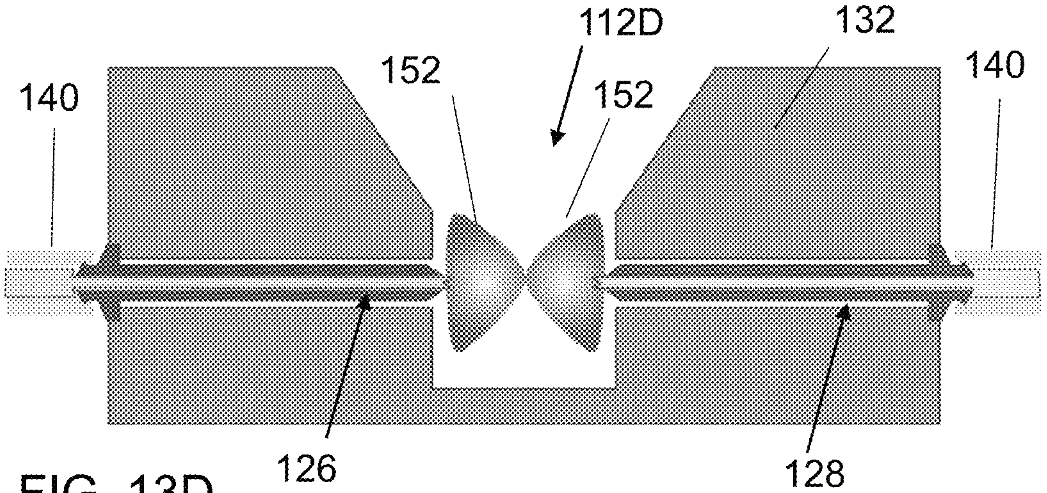
FIG. 13D is a side cross-sectional view of the CLF-PPT of FIGS. 13A to 13C after the drops of conductive liquid have each formed a plasma cloud.
Figure 13E:
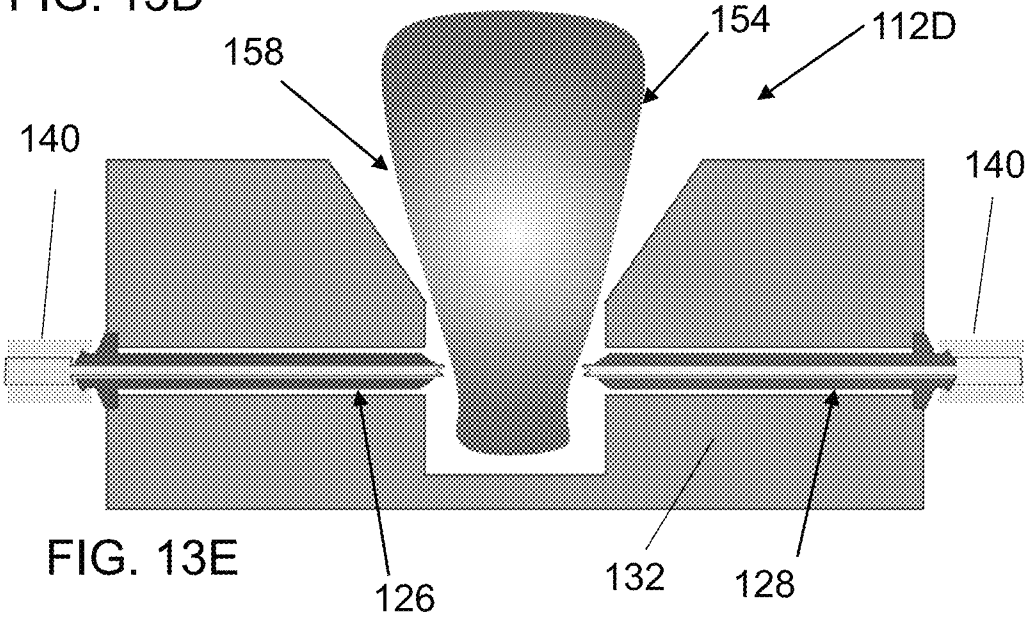
FIG. 13E is a side cross-sectional view of the CLF-PPT of FIGS. 13A to 13D as the plasma clouds are accelerated to form an exhaust plume as they are perpendicularly exhausted from the LF-PPT to provide thrust.

FIGS. 13A to 30E illustrate operation of the CLF-PPT 112D according to the fourth embodiment of the present invention. FIG. 13A shows the CLF-PPT 112D as the conductive liquid 120 is flowing into the conductive liquid passage 134 and begins to extend out of the outlet 138 of the conductive liquid passage 134 of each of the first and second electrodes 126, 128. The solid portions 126A of the first electrodes 126 are energized by the capacitive stored energy 116. The conductive liquid portions 126B are in contact with the solid portions 126A of the first electrodes 126 so they are also energized. FIG. 13B shows that as the conductive liquid 120 continues to be pumped into the CLF-PPT 112D, the drops 148 form at the ends of the conductive liquid 120 in the ignition space 130 between the outlets 138 of the conductive liquid passages 134 and are supported by the wetting walls 160. FIG. 13C shows that as the conductive liquid 120 continues to be pumped into the CLF-PPT 112D, the supported drops 148 continue to grow and be supported by the wetting walls 160 until they grow toward each other enough in the linear direction that that they are close enough together that they ignite by an arc formed in the linear direction between the drops 148. FIG. 13D shows that this ignition of the drops 148 of conductive liquid 120 cause plasma clouds 152 to form in the ignition space 130. FIG. 13E shows the plasma clouds 152 being combined and accelerated by Lorentz forces perpendicular to the direction of the arc to form an exhaust plume 154 as it is perpendicularly exhausted out of the open side 158 between the first and second electrodes 126, 128 to provide thrust. Once exhausted, the sequence of events repeats beginning back at FIG. 13A thus causing pulsed operation of the CLF-PPT 112D. It is noted that due to this repeated explosive ablation of the conductive liquid portions 126C of the first electrodes 126, pulsing action occurs naturally and thus no switching electronics are required.

Figure 14:
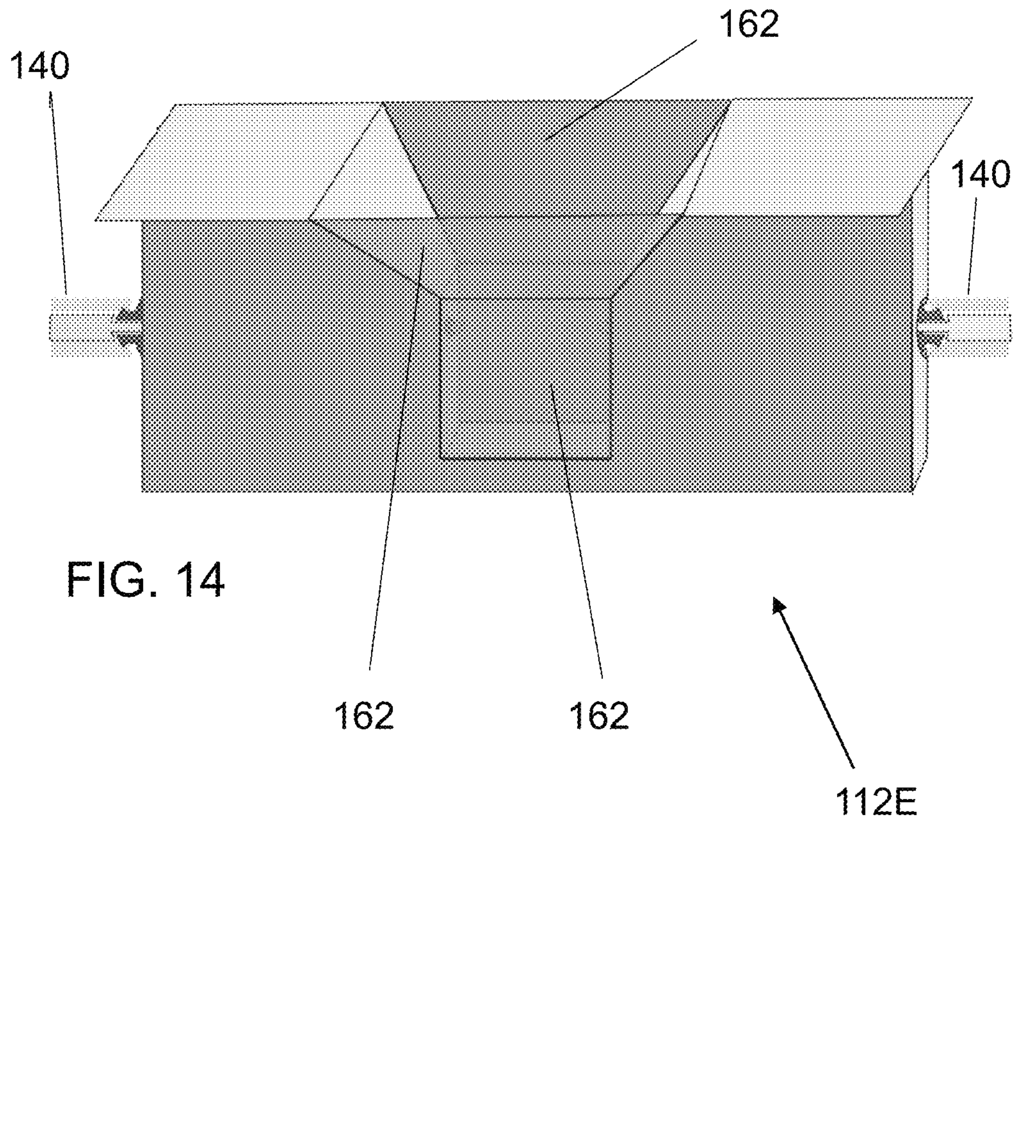
FIG. 14 is a perspective view of a CLF-PPT which is a variation the CLF-PPT of FIG. 12 wherein the space between pair of electrodes is enclosed except for an exhaust port provided with a nozzle.

FIG. 14 illustrates a CLF-PPT 112E according to a variation of the CLF-PPT 112D of the fourth embodiment of the present invention. The CLF-PPT 112E is substantially the same as the CLF-PPT 112D except that insulator 132 has a different configuration.

The illustrated insulator 132 includes a pair of laterally spaced apart side walls 162 that enclose the space between the first and second electrodes 126, 128 including the ignition space 130. A top portion of the side walls 162 angle outward in an to form a nozzle 164. It is noted that the side walls and/or nozzle can alternatively have any other suitable configuration.

Figure 15:
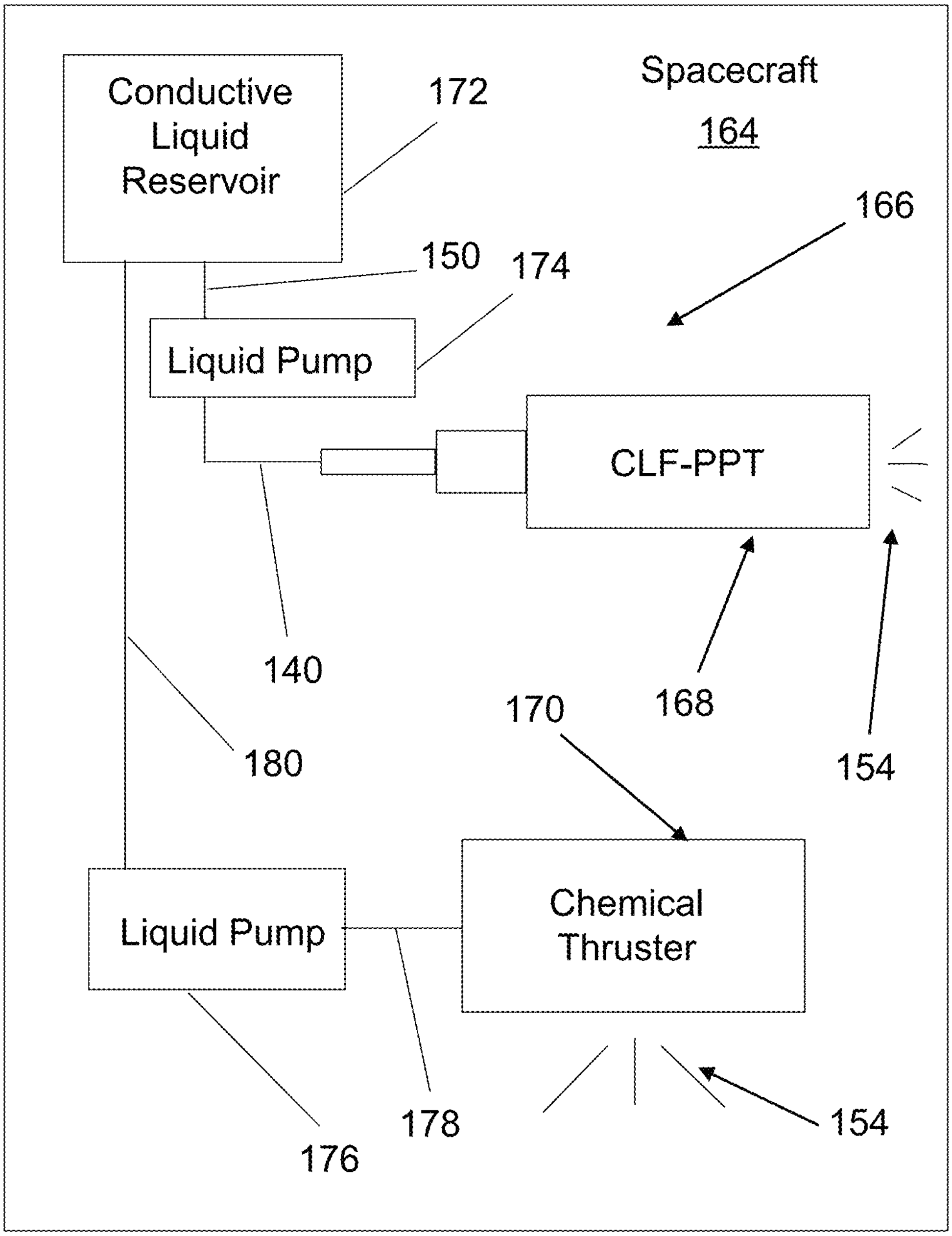
FIG. 15 is schematic view of a spacecraft according to an embodiment of the present invention including at least electric thruster and at least one chemical thruster and operating in multi-mode with regard to propellant.

FIG. 15 illustrates a spacecraft 164 according to another embodiment of the present invention. The illustrated spacecraft 164 has a propulsion system 166 including more than one type of thruster. The illustrated propulsion system 166 includes an electric thruster 168 and a chemical thruster 170 that utilize a common conductive liquid propellant. The illustrated electric thruster 168 is a CLF-PPT 112A according to the first embodiment of the invention. It is noted that the electric thruster 168 can alternatively have any other suitable quantity and/or can be of any other suitable type of electric thruster that utilizes the common conductive liquid propellant with the chemical thruster 170. This allows multimode operation of the conductive liquid propellant. The illustrated chemical thruster 170 utilizes a reactive liquid propellant. It is noted that the chemical thruster 170 can alternatively have any other suitable quantity and/or can be of any other suitable type of chemical thruster that utilizes the common conductive liquid propellant along with the electric thruster 168. The conductive liquid propellant is stored in a common reservoir 172 that is in operative fluidic connection with both of the thrusters 168, 170 via separate suitable liquid pumps 174, 176 and liquid conduits 140, 150, 178, 180. It is noted that the spacecraft 164 and/or the propulsion system 166 can alternatively have any other suitable configuration.

This multimode concept enables flexibility between low thrust, high efficiency electric propulsion maneuvers and high thrust, low efficiency chemical propulsion maneuvers. This flexibility provides significant advantages for spacecraft resilience. A liquid fed pulsed plasma thruster, especially one compatible with multimode propulsion propellants, has the potential to support this role. Compared to other electric propulsion systems, the pulsed plasma thruster has a number of potential advantages such as small size and minimal complexity. The potential compatibility with existing chemical thruster form factors also makes it a promising candidate for a single thruster/single tank ideal configuration for a multimode system.

It can be appreciated from the above disclosure that a conductive liquid can be used as both propellant and sacrificial anode in a pulsed plasma thruster in order to mitigate performance limitations due to anode erosion in pulsed plasma thrusters. By flowing the conductive liquid through a high temperature dielectric material into a conductive solid material, the liquid itself can serve as both propellant and anode in striking a high voltage arc discharge to deposit high energy density into a small volume of propellant. The propellant is ohmically ablated and ejected from the thruster to provide thrust. As the anode material ablates, the surface recesses breaking the circuit to allow energy storage for the subsequent pulse. It can further be appreciated from the above disclosure that a further advantage of the disclosed low specific mass high power electric propulsion system compatible with existing ionic liquids (such as, for example but not limited to, EMI-BF4), energetic ionic liquids (such as, for example but not limited to, ASCENT), and liquid metal propellants (such as, for example but not limited to) lithium or mercury.

It can also be appreciated from the above disclosure that one of the key advantages of the thrusters according to the present invention is mechanical and electrical simplicity. It can further be appreciated that another advantage comes from avoiding the need for highspeed vacuum compatible pulsed electronics because the erosion of the fuel and subsequent liquid feed replenishment provides the necessary vacuum switching mechanism and avoids inefficiencies due to incomplete ionization and fuel blow-by and other inefficiencies of prior art active pulsed electronics systems.

It is noted that each of the features and components of the various embodiments of the present can be used with each of the other embodiments of the present invention if desired.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A conductive liquid-fed pulsed plasma thruster system comprising:

at least one reservoir for storing an electrically-conductive liquid propellent;

an electric power source;

at least one conductive liquid-fed pulsed plasma thruster including a first electrode and a second electrode separated to define an ignition space therebetween;

wherein the first electrode includes a conductive solid portion and a conductive liquid portion, the conductive solid portion is formed by an elongate body of an electrically-conductive solid material having an elongate passage therein from an inlet to an outlet wherein the inlet is at a rear end of the conductive solid portion and the outlet is located at a front end of the solid conductive portion, the outlet is located at the ignition space, and the conductive liquid portion is formed by a the electrically-conductive liquid propellent located within the elongate passage and any drop of the electrically-conductive liquid propellant formed outside the outlet of the elongate passage and along a linear central axis of the elongate passage;

wherein the first electrode and the second electrode are operably connected to the electric power source so that one of the first electrode and the second electrode operates as an anode and the other of the first electrode and the second electrode operates as a cathode;

at least one electric insulator separating the first electrode and the second electrode wherein at least one wall of the at least one electric insulator surround the first electrode and are adjacent to the front end of the conductive solid portion such that a portion of the front end extends from the at least one wall;

at least one pump connected in fluidic communication with the reservoir and the at least one conductive liquid-fed pulsed plasma thruster and configured to supply the electrically-conductive liquid propellent from the reservoir to the inlet of the first electrode so that the-drop of the electrically-conductive liquid portion of the first electrode forms at the outlet and grows toward the second electrode when the electrically-conductive liquid propellent flows through the conductive liquid passage until-the drop of the electrically-conductive liquid propellent grows enough to be close enough to the second electrode to cause an arc discharge to form between the drop and the second electrode that vaporizes the drop to produce a superheated high-density plasma cloud that expands and exhausts to form a thrust pulse, and so that, after the thrust pulse is generated, additional drops are repeatedly formed and grown at the outlet of the first electrode to generate additional thrust pulses; and wherein the electrically-conductive liquid propellent is the only propellent utilized by the at least one conductive liquid-fed pulsed plasma thruster to generate the thrust pulses.

2. The conductive liquid-fed pulsed plasma thruster system according to claim 1, wherein the first electrode and the second electrode are coaxial and the second electrode is in the form of a tube with the ignition space located therein.

3. The conductive liquid-fed pulsed plasma thruster system according to claim 2, wherein the drop expands radially toward an inner surface of the second electrode to cause the arc discharge.

4. The conductive liquid-fed pulsed plasma thruster system according to claim 1, wherein the first electrode and the second electrode are linearly aligned, spaced apart so that the ignition space is located therebetween, and facing one another.

5. The conductive liquid-fed pulsed plasma thruster system according to claim 4, wherein the drop expands linearly toward the second electrode to cause the arc discharge.

6. The conductive liquid-fed pulsed plasma thruster system according to claim 4, wherein the second electrode includes a second conductive solid portion formed by an elongate body of an electrically-conductive solid material having a second elongate passage therein from a second inlet to a second outlet, the second outlet is located at the ignition space and a second conductive liquid portion formed by the electrically-conductive liquid propellent within the second elongate passage and any second drop of the electrically-conductive liquid propellent formed outside the second outlet of the second elongate passage and along a linear central axis of the second elongate passage, and wherein the first electrode and the second electrode are configured so that the second drop of the second conductive liquid portion forms at the second outlet and grows toward the drop of the first electrode when the electrically-conductive liquid propellent-flows through the second conductive liquid passage until the second drop is close enough to the drop that an arc discharge is formed between the second drop of the second electrode and the drop of the first electrode to generate the thrust pulse.

7. The conductive liquid-fed pulsed plasma thruster system according to claim 4, wherein the insulator forms a wall adjacent the outlet which supports the drop of the electrically-conductive liquid propellant.

8. The conductive liquid-fed pulsed plasma thruster system according to claim 1, wherein the electrically-conductive liquid propellent is one of an ionic liquid, a conductive reactive propellant, and a liquid metal.

9. A spacecraft propulsion system comprising:

a conductive liquid-fed pulsed plasma thruster comprising:

a first electrode having a conductive solid portion, having a rear end and a front end, and a conductive liquid portion wherein the conductive liquid portion is formed by a an electrically-conductive liquid propellent;

a second electrode separated to define an ignition space therebetween;

at least one electric insulator separating the first electrode and the second electrode wherein at least one wall of the at least one electric insulator surround the first electrode and are adjacent to a front end of the conductive solid portion such that a portion of the front end extends from the at least one wall;

a conductive-liquid passage extending within the conductive solid portion through which the electrically-conductive liquid propellent flows from an inlet to an outlet, wherein the outlet is located at the ignition space; and wherein the first electrode and the second electrode are configured so that repeatedly a drop of the conductive liquid portion forms at the outlet and grows toward the second electrode when the electrically-conductive liquid propellent flows through the conductive liquid passage until-the drop of the electrically-conductive liquid grows enough to be close enough to the second electrode to cause an arc discharge to form between the drop and the second electrode that vaporizes the drop to produce a superheated high-density plasma cloud that generates a thrust pulse when expanded and exhausted and after the thrust pulse is generated, additional drops are repeatedly formed and grown at the outlet of the first electrode to generate additional thrust pulses;

a power source operatively connected to the first electrode and the second electrode so that one of the first electrode and the second electrode operates as an anode and the other of the first electrode and the second electrode operates as a cathode; a conductive-liquid reservoir for holding the electrically-conductive liquid propellent;

a pump connected in fluidic communication with the conductive-liquid reservoir and the inlet of the first electrode to supply the electrically-conductive liquid propellent to the first electrode; and wherein the electrically-conductive liquid propellent is the only propellent utilized by the at least one conductive liquid-fed pulsed plasma thruster to generate the thrust pulses.

10. The spacecraft propulsion system according to claim 9, wherein the first electrode and the second electrode are coaxial, and the second electrode is in the form of a tube with the ignition space located therein.

11. The spacecraft propulsion system according to claim 10, wherein the drop expands radially toward an inner surface of the second electrode to cause the arc discharge.

12. The spacecraft propulsion system according to claim 9, wherein the first electrode and the second electrode are linearly aligned, spaced apart so that the ignition space is located therebetween, and facing one another.

13. The spacecraft propulsion system according to claim 12, wherein the drop of the electrically-conductive liquid propellent expands linearly toward the second electrode to cause the arc discharge.

14. The spacecraft propulsion system according to claim 12, wherein the second electrode includes a second conductive solid portion and a second conductive liquid portion formed by the electrically-conductive liquid propellent, a second conductive-liquid passage extends within the second conductive solid portion of the second electrode through which the the electrically-conductive liquid propellent flows from a second inlet to a second outlet, wherein the another second outlet is located at the ignition space, and wherein the first electrode and the second electrode are configured so that a second drop of the second conductive liquid portion forms at the second outlet and grows-toward the drop of the first electrode when the electrically-conductive liquid propellent flows through the second conductive liquid passage until the second drop is close enough to the drop that an arc discharge forms between the second drop of the second electrode and the drop of the first electrode to generate the thrust pulse, and wherein the outlet of the first electrode and the second outlet of the second electrode are coaxial.

15. The spacecraft propulsion system according to claim 14, wherein the at least one pump is connected in fluidic communication with the conductive-liquid reservoir and the second inlet of the second electrode.

16. The spacecraft propulsion system according to claim 12, wherein the insulator forms a wall adjacent the outlet which supports the drop of the electrically-conductive liquid propellent.

17. The spacecraft propulsion system according to claim 9, wherein the electrically-conductive liquid propellent is one of an ionic liquid, a conductive reactive propellant, and a liquid metal.

18. A method for propelling a spacecraft comprising a conductive liquid-fed pulsed plasma thruster comprising a first electrode having a conductive solid portion with a rear end and a front end, and a conductive liquid portion, wherein the conductive liquid portion is formed of a an electrically-conductive liquid propellent, and a second electrode separated from the first electrode to define an ignition space therebetween, at least one electric insulator separating the first electrode and the second-electrode wherein at least one wall of the at least one electric insulator surround the first electrode and are adjacent to a front end of the conductive solid portion such that a portion of the front end extends from the at least one wall, and a conductive-liquid passage extending within the conductive solid portion through which the electrically-conductive liquid propellent flows from an inlet to an outlet, wherein the outlet is located at the ignition space, the method comprising the steps of:

forming a drop of the electrically-conductive liquid propellent outside the outlet of the first electrode by supplying the electrically-conductive liquid propellent into the inlet of the first electrode;

growing the drop of the electrically-conductive liquid propellent outside the outlet of the first electrode toward the second electrode by continuing to supply the electrically-conductive liquid propellent into the inlet of the first electrode until the drop of the electrically-conductive liquid propellent grows enough to be close enough to the second electrode to cause an arc discharge to form between the drop of the electrically-conductive liquid propellent and the second electrode that vaporizes the drop of the electrically-conductive liquid propellent to produce a superheated high-density plasma cloud that generates a thrust pulse when expanded and exhausted, wherein the electrically-conductive liquid propellent is the only propellent utilized by the conductive liquid-fed pulsed plasma thruster to generate the thrust pulses; and after generating the thrust pulse, repeating the steps of forming the drop and growing the drop to generate a pulsing thrust.

* * * * *